(12) United States Patent
Asahara et al.

(10) Patent No.: US 6,192,851 B1
(45) Date of Patent: Feb. 27, 2001

(54) VIBRATION REDUCING SYSTEM FOR INTERNAL COMBUSTION ENGINE

(75) Inventors: Yasuyuki Asahara; Izuho Hirano, both of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/314,168

(22) Filed: May 19, 1999

(30) Foreign Application Priority Data

May 19, 1998 (JP) .................................. 10-137172
May 19, 1998 (JP) .................................. 10-137182

(51) Int. Cl.$^7$ ...................................................... F02B 75/06
(52) U.S. Cl. ............................................................ 123/192.2
(58) Field of Search ............................ 123/192.1, 192.2; 74/574

(56) References Cited

U.S. PATENT DOCUMENTS

| 3,563,223 | * | 2/1971 | Ishida ................................... 123/192 |
| 4,791,829 | * | 12/1988 | Fukushima et al. .................... 74/574 |
| 5,537,967 | * | 7/1996 | Tashiro et al. ...................... 123/192.1 |

FOREIGN PATENT DOCUMENTS

| 3230168 | * | 2/1984 | (DE) ................................. 123/192.2 |
| 59-047528 | * | 3/1984 | (JP) ...................................... 384/490 |

\* cited by examiner

*Primary Examiner*—Willis R. Wolfe
*Assistant Examiner*—Katrina B. Harris
(74) *Attorney, Agent, or Firm*—Foley & Lardner

(57) ABSTRACT

A vibration reducing system of an internal combustion engine for an automotive vehicle. The vibration reducing system comprises a roll vibration system which generates a roll vibration of an engine main body, the roll vibration having a first vibration mode. Additionally, a rotational vibration system is provided to generate a rotational vibration having a second vibration mode, and includes a crankshaft of the engine, for generating a rotational driving force, a main flywheel fixedly connected to the crankshaft, a driving force transmitting mechanism through which the rotational driving force of the crankshaft is transmitted, the driving force transmitting mechanism being movably secured to the engine main body, and an inertial mass member drivably connected to the driving force transmitting mechanism and rotatable to generate an inertial force upon receiving the rotational driving force transmitted through the driving force transmitting mechanism. In the vibration reducing system, the first and second vibration modes cause antiresonance at an antiresonance frequency. Additionally, the rotational vibration system is adjusted to cause the antiresonance frequency to be generally coincident with one of frequencies which are obtained respectively by multiplying an engine-revolutional frequency at a predetermined engine speed by values each being represented by (a natural number/2).

31 Claims, 20 Drawing Sheets

VIBRATION REDUCING SYSTEM FOR INTERNAL COMBUSTION ENGINE

BACKGROUND OF THE INVENTION

This invention relates to improvements in a vibration reducing system for reducing vibration of an internal combustion engine itself, caused by fluctuation of combustion pressure in the engine, and more particularly to the vibration reducing system for reducing roll vibration of the engine itself by using an inertial mass member which rotates in a right or reverse direction relative to a crankshaft.

Recently, attention has been increasingly paid on improving fuel economy in automotive engines, from the viewpoint of environmental protection, and therefore footlights have been put on direct injection gasoline-fueled engines and direct injection diesel engine in which fuel is directly injected into each engine cylinder, for automotive vehicles. However, such engines are high in combustion exciting force and accordingly large in roll vibration due to torque fluctuation as compared with conventional engines. Thus, such engines will induce booming noise within a passenger compartment, due to the roll vibration of the engine, and increase or degrade floor vibration of a vehicle body.

In view of the above, as a measure for solving the above drawbacks, a vibration reducing system for an internal combustion engine has been proposed in Japanese Patent Provisional Publication No. 6-33990.

BRIEF SUMMARY OF THE INVENTION

In the vibration reducing system proposed in Japanese Patent Provisional Publication No. 6-33990, an auxiliary flywheel is provided in addition to a main flywheel fixedly connected to a rear end section of a crankshaft of the engine. The auxiliary flywheel is driven in an opposite direction to the crankshaft through a belt by a crankshaft pulley which is directly connected to the front end section of the crankshaft. As a result, a moment which is in the opposite direction to a moment to be applied to the engine main body is generated as a reaction of torque generation, thereby canceling roll vibration of the engine main body.

Here, in order to fully remove the roll vibration of the engine with the above conventional vibration reducing system, it is required to theoretically meet a condition of $I_1 = \rho \cdot I_2$ where $I_1$ is a moment of inertia of a rotational body including the main flywheel and the like in the engine main body; $I_2$ is a moment of inertia of the auxiliary flywheel; and $\rho$ is a speed increasing ratio. Additionally, reduction effect for the roll vibration can be achieved around this condition. To meet the above condition, it is necessary to enlarge the moment of inertia $I_2$ of the auxiliary flywheel, or the speed increasing ratio $\rho$, since the moment of inertia $I_2$ of the main flywheel is inherently large.

However, enlarging the moment of inertia $I_2$ of the auxiliary flywheel causes a weight-increase of the vibration reducing system. Additionally, enlarging the speed increasing ratio $\rho$ causes the auxiliary flywheel to rotate at a high speed, thereby contributing to lowering the durability of a bearing section of the auxiliary flywheel. Consequently, it has been actually impossible to fully remove roll vibration of the engine main body, so that the conventional vibration reducing system has been limited in obtaining vibration reduction effect.

In view of the above, an object of the present invention is to provide an improved vibration reducing system for an internal combustion engine, which effectively overcomes drawbacks encountered in conventional vibration reducing systems.

Another object of the present invention is to provide an improved vibration reducing system for an internal combustion engine, which can sharply reduce roll vibration of an engine main body in a certain engine operating range where reduction of the roll vibration is particularly required.

A further object of the present invention is to provide an improved vibration reducing system for an internal combustion engine, which can sharply reduce roll vibration of an engine main body in each of a plurality of engine operating ranges where reduction of the roll vibration is particularly required.

A first aspect of the present invention resides in a vibration reducing system of an internal combustion engine. The vibration reducing system comprises a roll vibration system which generates a roll vibration of an engine main body, the roll vibration having a first vibration mode. Additionally, a rotational vibration system is provided to generate a rotational vibration having a second vibration mode, and includes a crankshaft of the engine, for generating a rotational driving force, a main flywheel fixedly connected to the crankshaft, a driving force transmitting mechanism through which the rotational driving force of the crankshaft is transmitted, the driving force transmitting mechanism being movably secured to the engine main body, and an inertial mass member drivably connected to the driving force transmitting mechanism and rotatable to generate an inertial force upon receiving the rotational driving force transmitted through the driving force transmitting mechanism. In the vibration reducing system, the first and second vibration modes cause antiresonance at an antiresonance frequency. Additionally, the rotational vibration system is adjusted to cause the antiresonance frequency to be generally coincident with one of frequencies which are obtained respectively by multiplying an engine-revolutional frequency at a predetermined engine speed by values each being represented by (a natural number/2).

Another aspect of the present invention resides in a method of reducing vibration in an internal combustion engine including a roll vibration system which generates a roll vibration of an engine main body, the roll vibration having a first vibration mode; and a rotational vibration system which generates a rotational vibration having a second vibration mode, and includes a crankshaft of the engine, for generating a rotational driving force; a main flywheel fixedly connected to the crankshaft; a driving force transmitting mechanism through which the rotational driving force of the crankshaft is transmitted, the driving force transmitting mechanism being movably secured to the engine main body, and an inertial mass member drivably connected to the driving force transmitting mechanism and rotatable to generate an inertial force upon receiving the rotational driving force transmitted through the driving force transmitting mechanism. The method comprises (a) causing the first and second vibration modes to coact so as to make antiresonance at an antiresonance frequency; and (b) adjusting the rotational vibration system so as to cause the antiresonance frequency to be generally coincident with one of frequencies which are obtained respectively by multiplying an engine-revolutional frequency at a predetermined engine speed by values each being represented by (a natural number/2).

BRIEF DESCRIPTION OF THE DRAWINGS

In the drawings, like reference numerals designate like parts and elements throughout all the figures, in which.

DETAILED DESCRIPTION OF THE EMBODIMENT

Figure 1:
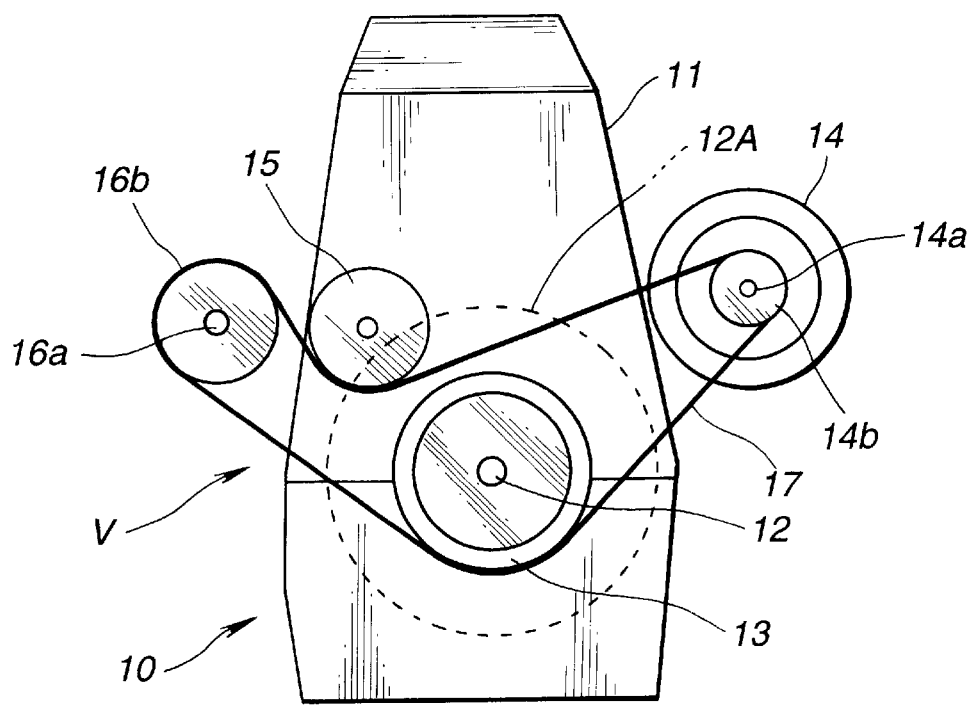
FIG. 1 is a schematic front elevation of an engine provided with a first embodiment of a vibration reducing system according to the present invention.
Figure 2:
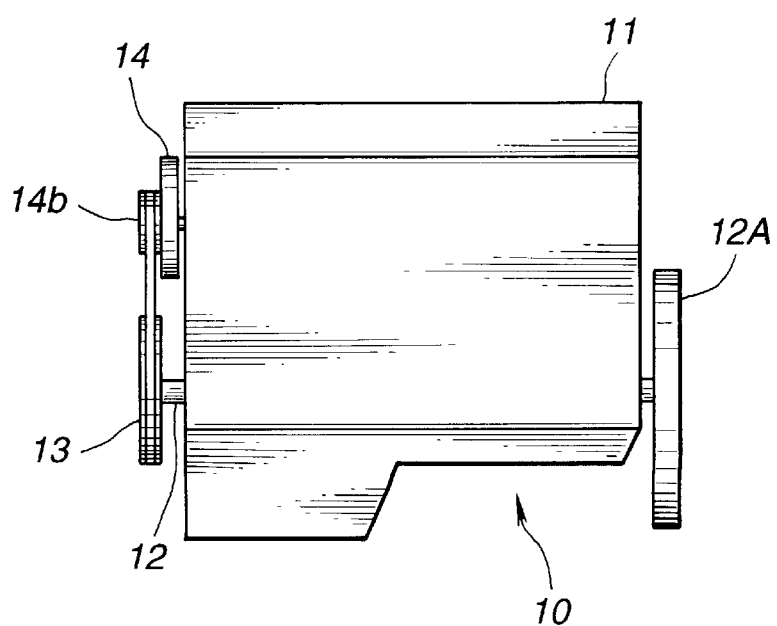
FIG. 2 is a schematic side elevation of the engine of FIG. 1.

Referring now to FIGS. 1 and 2 of the drawings, an internal combustion engine 10 is shown to be provided with or incorporate therewith a first embodiment of a vibration reducing system V according to the present invention. The engine in this embodiment is for an automotive vehicle (not shown). The engine 10 includes an engine main body 11 which has a crankshaft 12 through which driving force is generated. The crankshaft 12 has its front end section which projects out of the front end of the engine main body 11. A crank pulley 13 fixedly mounted on the front end section of the crankshaft 12. A main flywheel 12A is fixedly mounted on the rear end section of the crankshaft 12 which end section projected out of the rear end of engine main body 11. An alternator 14 and a power steering pump 16 forming part of a power steering system are provided as engine accessories to the engine main body 11. The alternator 14 has its rotational shaft 14a on which an alternator pulley 14b is fixedly mounted. The alternator pulley 14b is drivably connected with the crank pulley 13 through an elastic belt 17 for driving the engine accessories. The belt 17 is passed on the crankshaft pulley 13 and the alternator pulley 14b and additionally on an idler pulley 15 and a pulley 16b of the power steering pump 16, so that the alternator pulley 14b is drivably connected with the crankshaft pulley 13 through the idler pulley 15 and the power steering pump pulley 16b.

Figure 3:
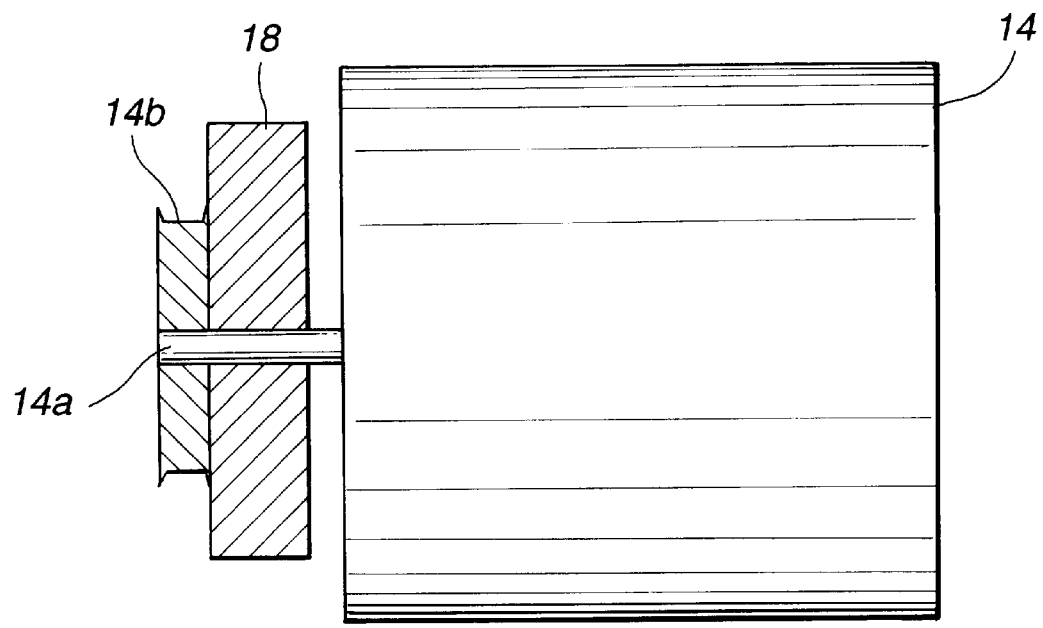
FIG. 3 is a schematic enlarged side view showing the connectional relationship between an auxiliary flywheel and an accessory of the engine of FIG. 1.

As shown in FIG. 3, an auxiliary flywheel 18 serving as an inertial mass member is fixedly mounted on the rotational shaft 14a of the alternator 14 so as to be rotatable with the rotatable shaft 14a as a single body. Additionally, the auxiliary flywheel 18 is coaxially fixed to the alternator pulley 14b so as to be rotatable with the alternator pulley 14b as a single body. The alternator pulley 14b serves as a driven pulley for causing the auxiliary flywheel 18 to rotate. The alternator pulley 14b, the crankshaft pulley 13, the accessories driving belt 17 and the like constitute a driving force transmitting mechanism for transmitting the rotational driving force of the crankshaft 12 to the inertial mass member 18.

In the above-arranged engine 10, roll vibration occurs when the engine operates to rotate the crankshaft 12, thus forming a roll vibration system which has inherent or certain resonance frequencies. It will be understood that the roll vibration means vibration of the engine main body 11 in a direction around a roll axis (not shown) which is parallel with the axis of the crankshaft 12. Accordingly, the roll vibration system includes the engine main body 11 which is elastically supported on a vehicle body (not shown) through engine mounts (not shown). Additionally, rotational vibration occurs when the engine accessories are driven under the rotational force transmitted from the crankshaft 12, thus forming a rotational vibration system of the engine accessories. The accessories rotational vibration system has inherent or certain resonance frequencies. The accessories rotational vibration system has a spring component constituted of the accessories driving belt 17, and a mass component constituted of the auxiliary flywheel 18, a rotor section of the alternator 14, rotational sections (including the crankshaft pulley 13, the crankshaft 12, the main flywheel 12A, and the like) of the engine main body 11. It will be understood that there exits an engine operating region in which an antiresonance occurs between the accessories rotational vibration system and the roll vibration system which are influenced with each other. In the antiresonance, the vibration modes of the accessories rotational vibration system and the roll vibration system are opposite in phase and cancelled with each other.

In the above engine 10, the engine components constituting the accessories rotational vibration system and the roll vibration system are set such that the antiresonance appears in an engine operating range (for example, idling operating condition) in which the engine is frequently operated at a predetermined engine speed while roll vibration is problematic.

Figure 4:
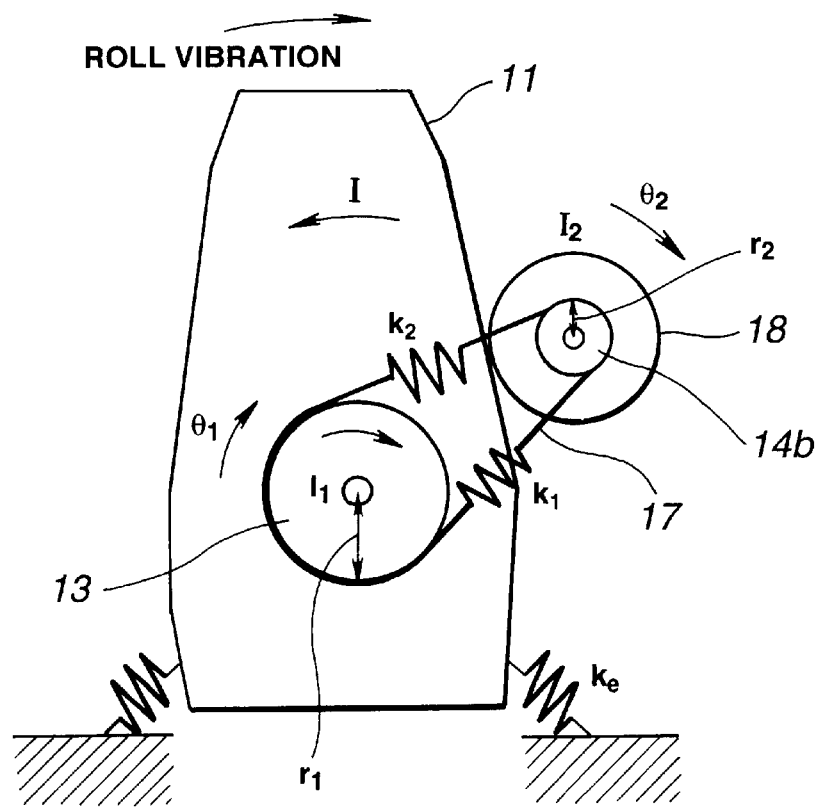
FIG. 4 is a schematic diagram showing a vibration model of the engine of FIG. 1.

Hereinafter, discussion will be made on a process for making such a setting that the antiresonance appears in a desired engine operating range. First, a vibration system of the engine 10 shown in FIG. 1 can be approximated with a vibration model as shown in FIG. 4. With this vibration model, on the assumption that I is a moment of inertia around a roll axis (not shown) of the engine main body 11; $\phi$ is a roll displacement angle (an angle of displacement in a roll direction around the roll axis) of the engine main body 11; $I_1$ is a moment of inertia of a rotational system (including the crankshaft pulley 13, the crankshaft 12, the main flywheel 12A, and the like) of the engine body 11; $\theta_1$ is a displacement angle (angle of displacement) of the crankshaft pulley 13; $I_2$ is a moment of inertia of the auxiliary flywheel 18 or a body including the auxiliary flywheel 18 and the rotor section of the alternator 14; $\theta_2$ is a displacement angle of the auxiliary flywheel 18; $r_1$ is an effective radius of the crankshaft pulley 13; $r_2$ is a driven radius of the auxiliary flywheel 18 (an effective radius of the driven pulley 14b); $k_e$ is a roll spring constant (spring constant in a roll direction) of the engine main body 11; $k_1$ is a spring constant of the accessories driving belt 17 on an extension side; $f_1$ is a belt reaction of the accessories driving belt 17 on the extension side; $k_2$ is a spring constant of the accessories driving belt 17 on a contraction side; $f_2$ is a belt reaction of the accessories driving belt 17 on the contraction side; and T is an input torque, equations of motion of the vibration model as shown in FIG. 4 is given by the following equations (1):

$$\left. \begin{array}{l} I\dfrac{d^2\phi}{dt^2} = -T + (f_1 - f_2)(r_1 - r_2) - k_e\phi \\[4pt] I_1\dfrac{d^2\theta_1}{dt^2} = T - (f_1 - f_2)r_1 \\[4pt] I_2\dfrac{d^2\theta_2}{dt^2} = (f_1 - f_2)r_2 \\[4pt] f_1 - f_2 = \{r_1\theta_1 - r_2\theta_2 - (r_1 - r_2)\phi\}(k_1 + k_2) \end{array} \right\} \quad (1)$$

It will be understood that the above-mentioned "effective radius" means a radial distance between the center axis of a rotational member and the outer peripheral surface (of the rotational member) at which the accessories driving belt 17 contacts.

An antiresonance frequency f at which the antiresonance appears is determined from the above equations (1) under a condition in which $I \gg I_1, I_2$, and $\phi=0$, thereby providing the following equation (2):

$$f = \frac{1}{2\pi}\sqrt{\frac{r_2^2(I_1 + \rho I_2)(k_1 + k_2)}{I_1 I_2}} \qquad (2)$$

$$(\rho = r_1/r_2)$$

Figure 5:
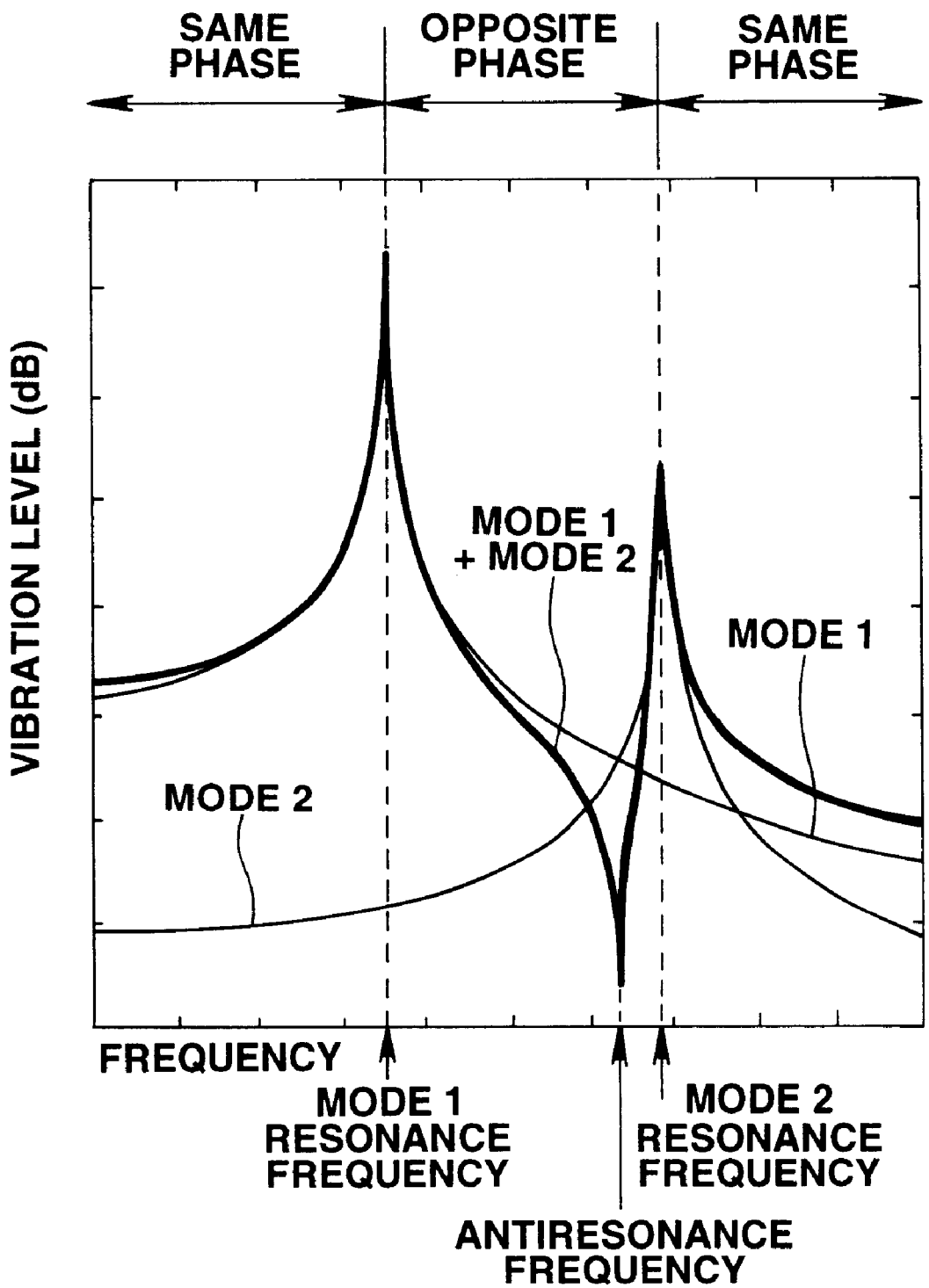
FIG. 5 is a graph showing vibration characteristics of vibration modes of a roll vibration system and an accessories rotational vibration system of the engine of FIG. 1.

This antiresonance frequency f is represented as a frequency at which a vibration mode 1 of the roll vibration system and a vibration mode 2 of the accessories rotational vibration system are opposite in phase so as to cancel the vibration modes 1 and 2 with each other, as shown in FIG. 5.

Here, the moment of inertia $I_1$ of the main flywheel 12A, the moment of inertia $I_2$ of the auxiliary flywheel 18, a speed increasing ratio $\rho$ ($r_1/r_2$), and the spring constants $k_1$, $k_2$, and the like in the engine 10 are set such that the antiresonance frequency f becomes generally coincident with one of frequencies which are obtained respectively by multiplying an engine-revolutional frequency fn (=N/60) at a predetermined engine speed N (r.p.m.) by values each of which is represented by (a natural number/2) or 0.5, 1, 1.5, 2, 2.5, 3, ... It will be understood that the engine speed corresponds to the revolution speed (r.p.m.) of the crankshaft 12. More specifically, in case of a four-cylinder engine, roll vibrations caused by the frequency components such as the 2nd harmonic component, the 4th harmonic component, the 6th harmonic component, ... and the like of the engine speed become large. In case of a six-cylinder engine, roll vibrations caused by the frequency components such as the 3rd harmonic component, the 6th harmonic component, ... and the like of the engine speed becomes large. In case of an eight-cylinder engine, roll vibrations caused by the frequency components such as the 4th harmonic component, the 8th harmonic component, ... and the like of the engine speed become large. Accordingly, by making setting such that the above-mentioned antiresonance frequency f become generally coincident with either one of the frequency components or harmonic components in the engine, the roll vibration of the engine can be reduced.

Additionally, in case that there is irregularity in combustion among a plurality of cylinders, roll vibrations caused by frequency components such as the 0.5th harmonic component, the 1st harmonic component, the 1.5th harmonic component, . . . and the like are generated. Therefore, by making setting such that the above-mentioned antiresonance frequency f become generally coincident with either one of such frequency components, roll vibrations of the engine can be similarly reduced.

It will be understood that, of various frequency components or harmonic components, (a number of cylinders of the engine/2)th harmonic component is particularly high. More specifically, the 2nd harmonic component is the largest in case of the four-cylinder engine; the 3rd harmonic component is the largest in case of the six-cylinder engine; and the 4th harmonic component is the largest in the eight-cylinder engine. Therefore, roll vibration of the engine can be reduced by setting the above antiresonance frequency f to be generally coincident with the frequency of the harmonic component.

Idling operating condition is exemplified as an engine operating condition in which roll vibration is problematic in a usual automotive vehicle. In this case, an engine speed of the idling operating condition is applied for the above-mentioned predetermined engine speed (N), and then setting the above antiresonace frequency f is made in this operating condition, thereby further reducing roll vibration of the engine.

Figure 6:
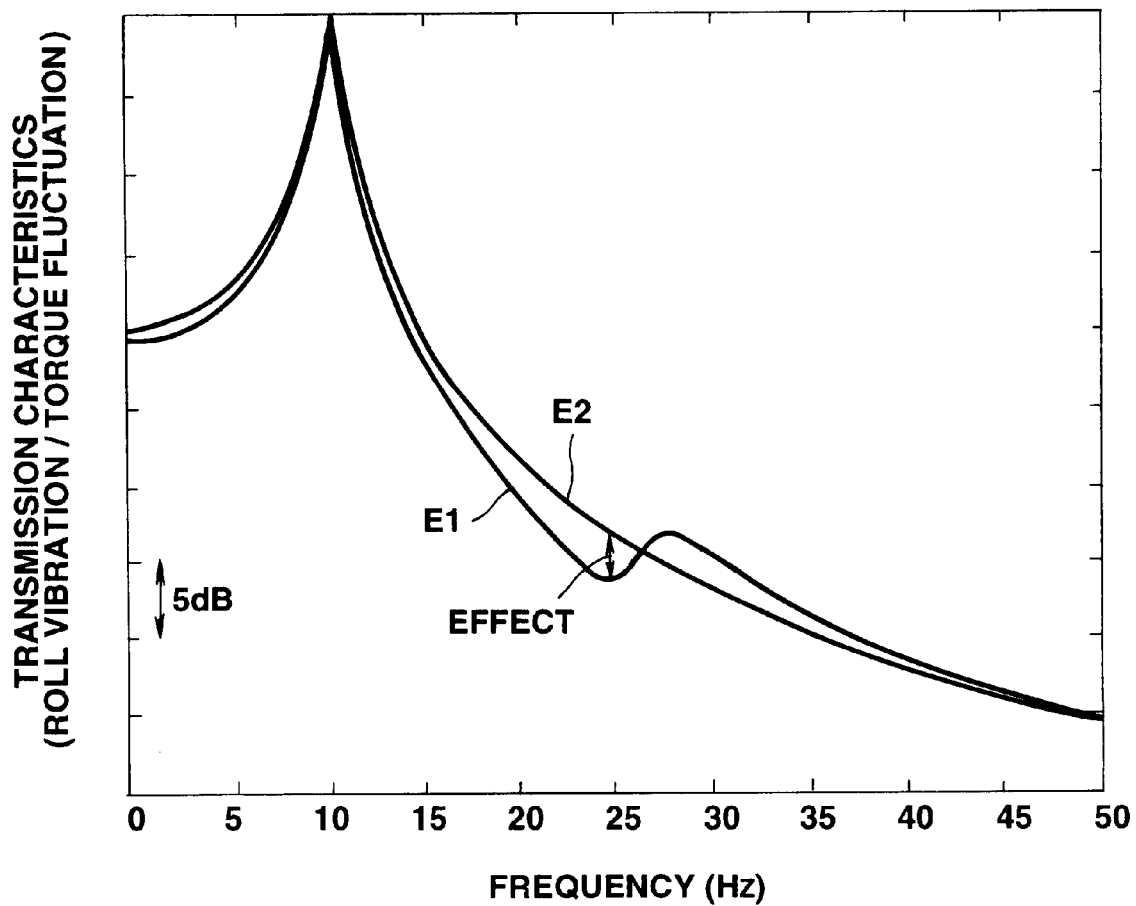
FIG. 6 is a graph showing a vibration transmission characteristics of the engine of FIG. 1.

Here, an example of the process for reducing roll vibration in accordance with the principle of the present invention will be discussed. In case of the four-cylinder gasoline-fueled engine having idling engine speed (the predetermined engine speed N) of 750 r.p.m., setting is made so as to cause the antiresonance frequency f to be coincident with the 2nd harmonic component of engine speed, i.e., 25 Hz ((750/60)× 2), thereby providing a result shown in FIG. 6 where a curve E1 indicates a vibration transmission characteristics (roll vibration/torque fluctuation) of the engine of this example, while a curve E2 indicates a vibration transmission characteristics of an engine similar to the engine of this example with the exception that the auxiliary flywheel 18 is connected to the crankshaft pulley 13 through gears without using the belt 17. As appreciated from FIG. 6, roll vibration is sharply reduced at the frequency (25 Hz) of the 2nd harmonic component. Roll vibration is degraded or increased around 28 Hz which is a resonance frequency of the accessories rotational vibration system; however, the engine speed N becomes about 1200 r.p.m. or higher so that the frequency of the 2nd harmonic component is 40 Hz ((1200/60)×2) or higher under normal engine operating conditions other than the idling operating condition. Therefore, such degradation of roll vibration around 28 Hz cannot become problematic.

Figure 7:
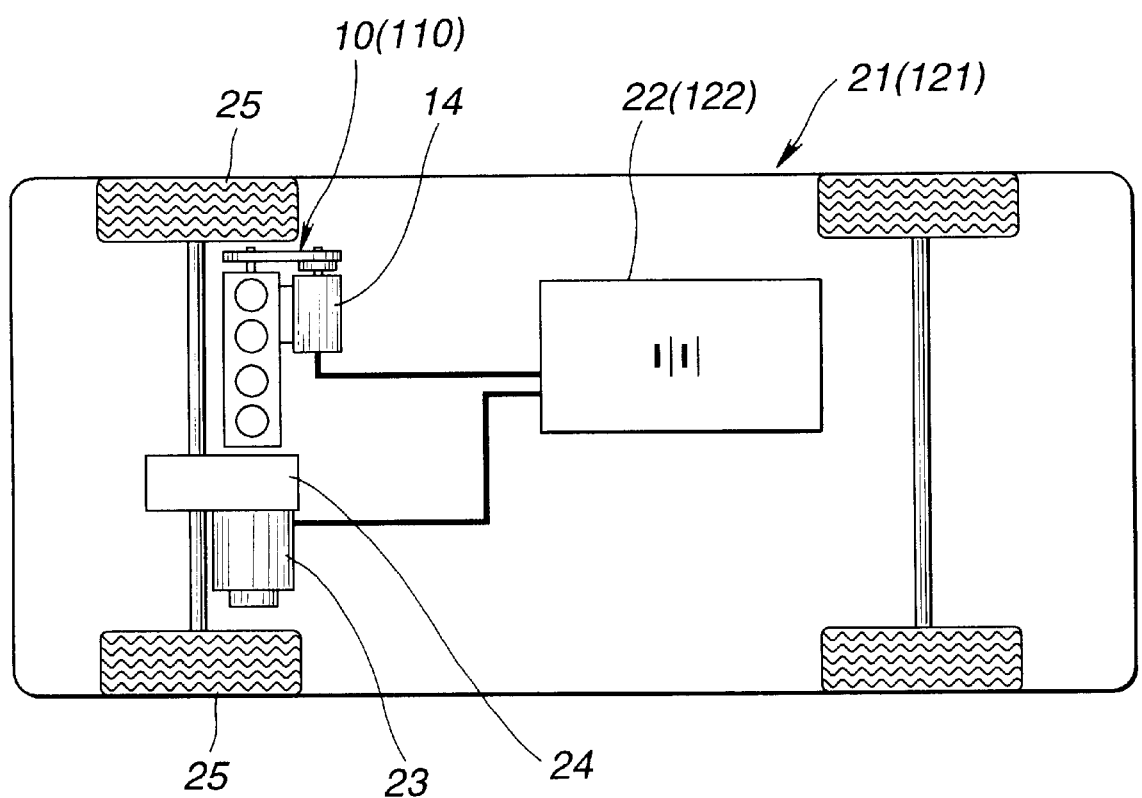
FIG. 7 is a schematic plan view illustrative of a hybrid drive vehicle equipped with the engine of FIG. 1.

Another example of the process for reducing roll vibration in accordance with the principle of the present invention will be discussed in connection with a series type hybrid drive vehicle 21 on which the engine 10 provided with the vibration reduction system V of the present invention is mounted, as shown in FIG. 7. In this hybrid drive vehicle 21, the engine 10 is used for driving the alternator 14 to generate electric power and serves only as a driving source for the alternator 14. Electric power generated by the alternator 14 is supplied through a battery 22 to an electric motor 23. The electric motor 23 drives road wheels 25, 25 through a transmission 24. Accordingly, the engine 10 is not required to directly drive the road wheels 25, 25 and therefore is operated at a constant engine speed under an engine operating condition where engine operational efficiency is the highest.

For example, in case that the engine speed is 3000 r.p.m. in the four-cylinder engine, roll vibration of the engine becomes the largest at the frequency of the 2nd harmonic component at the engine speed, i.e., 100 Hz ((3000/60)×2). Accordingly, by adjusting the moment of inertia $I_1$ of the main flywheel 12A, the moment of inertia $I_2$ of the auxiliary flywheel 18, a speed increasing ratio $\rho$ ($r_1/r2$), and the spring constants $k_1$, $k_2$, and the like, roll vibration of the engine can be sharply reduced.

Figure 8:
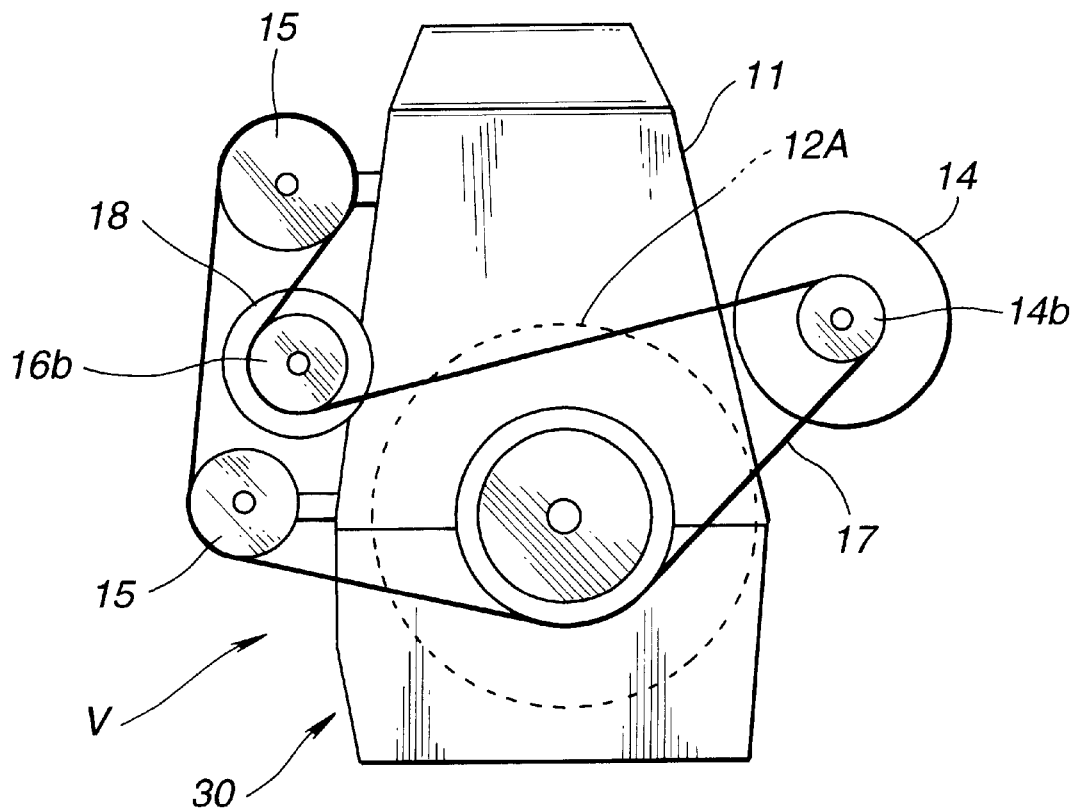
FIG. 8 is a schematic front elevation of an engine provided with a second embodiment of the vibration reducing system according to the present invention.

FIG. 8 illustrates an engine 30 provided with a second embodiment of the vibration reducing system according to the present invention. The engine 30 of this instance is similar to that in FIG. 1 and includes the crankshaft pulley 13 fixedly mounted on the front end section of the crankshaft 12. The alternator 14 has the alternator pulley 14b. Two idler pulleys 15, 15 are provided so that the power steering pump pulley 16b is located between them. The accessories driving belt 17 is passed on the crankshaft pulley 13, the alternator pulley 14b and the idler pulleys 15, 15, and passed at its back surface on the power steering pump pulley 16b, so that the power steering pump pulley 16b is drivably connected with the crankshaft pulley 13.

Figure 9:
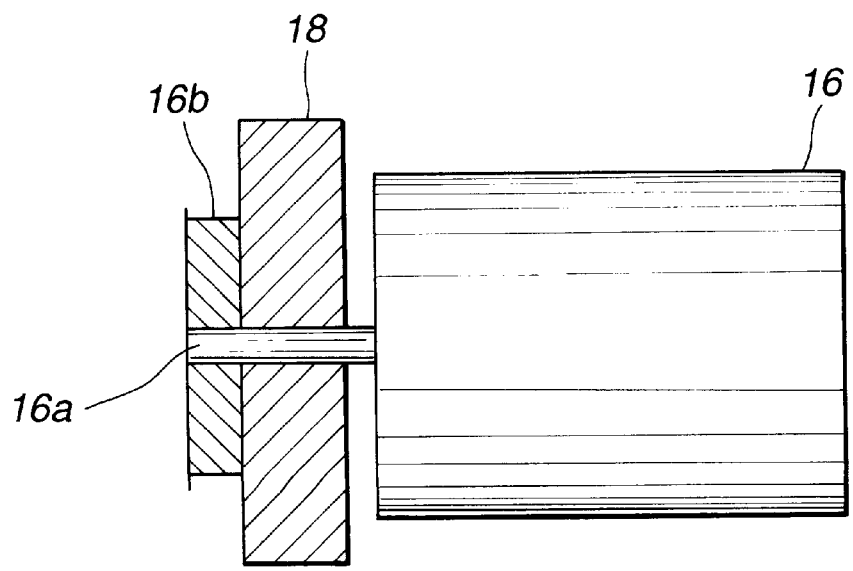
FIG. 9 is a schematic enlarged side view showing the connectional relationship between an auxiliary flywheel and an accessory of the engine of FIG. 8.

As shown in FIG. 9, the power steering pump 16 has a rotational shaft 16a on which the power steering pump pulley 16b is fixedly mounted. The auxiliary flywheel 18 serving as the inertial mass member is also fixedly mounted on the rotational shaft 16a so as to be rotatable together with the rotational shaft 16a as a single body. Additionally, the auxiliary flywheel 18 is fixed to the power steering pump pulley 16b so as to be rotatable with the pulley 16b as a single body. The power steering pump pulley 16b serves as a driven pulley to cause the auxiliary flywheel 18 to rotate. In this instance, the auxiliary flywheel 18 rotates in an opposite direction to the rotational direction of the crankshaft 12, as opposed to the instance as shown in FIG. 1.

The antiresonance frequency f at which antiresonace appears in the vibration system in the above-arranged engine 10 is given by the following equation (3) where $r_3$ is the effective radius of the power steering pump pulley 16b:

$$f = \frac{1}{2\pi} \sqrt{\frac{r_3^2(I_1 - \rho I_2)(k_1 + k_2)}{I_1 I_2}} \quad (3)$$

Figure 10:
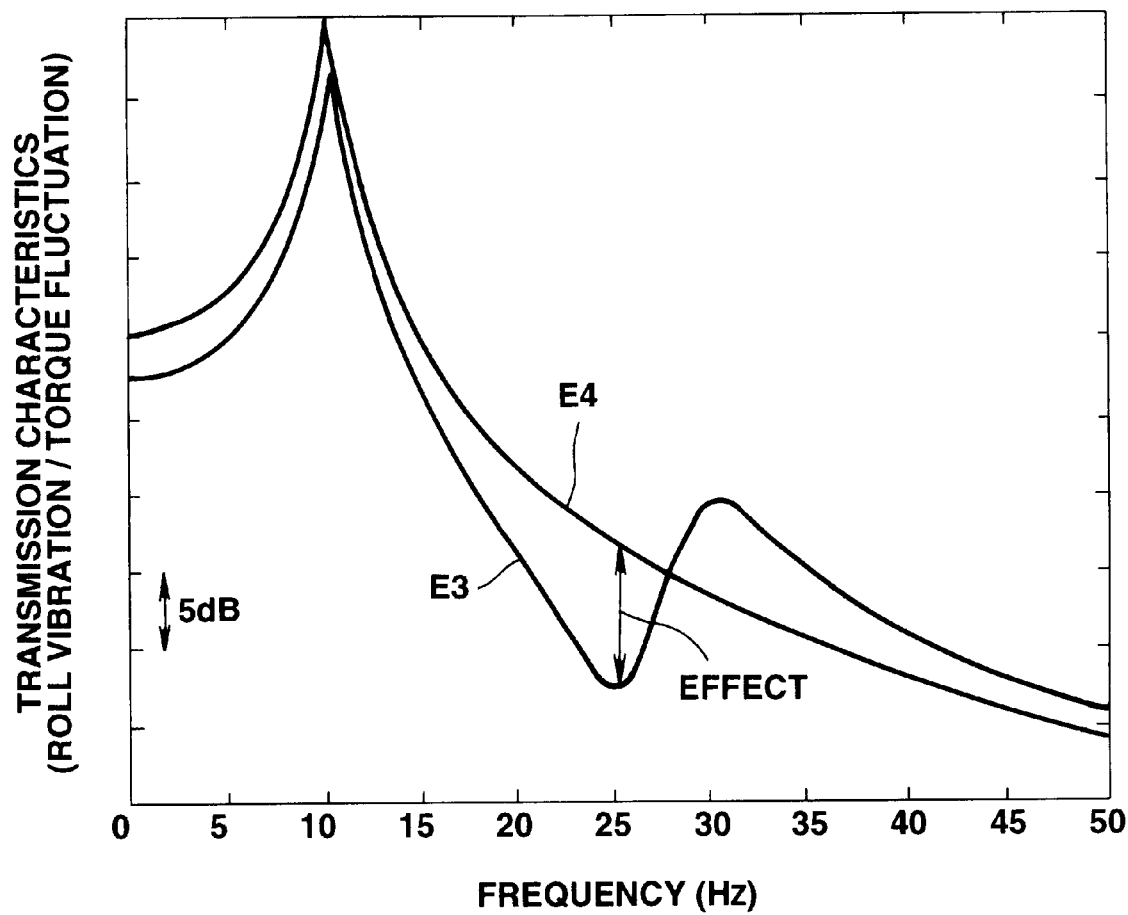
FIG. 10 is a graph showing a vibration transmission characteristics of the engine of FIG. 8.

Here, similarly to the instance discussed above, the moment of inertia $I_1$ of the main flywheel 12A, the moment of inertia $I_2$ of the auxiliary flywheel 18, a speed increasing ratio $\rho$ ($r_1/r_2$), and the spring constants $k_1$, $k_2$, and the like are set so as to cause the antiresonance frequency to be generally coincident with the frequency (25 Hz) of the 2nd harmonic component which is problematic in idling operating condition at an engine speed of 750 r.p.m. in the four-cylinder engine, thereby providing a result in vibration transmission characteristics as shown in FIG. 10. In FIG. 10, a curve E3 indicates the vibration transmission characteristics of the engine shown in FIG. 8 in which the antiresonance frequency is set in accordance with the present invention, while a curve E4 indicates the vibration transmission characteristics of a conventional engine similar to the engine shown in FIG. 8 with the exception that the auxiliary flywheel 18 is connected to the crankshaft pulley 13 through gears without using the belt 17.

As appreciated from FIG. 10, in this instance in which the auxiliary flywheel 18 rotates in the opposite direction to the rotational direction of the crankshaft 12, the degree of roll vibration reducing effect is increased as compared with the instance shown in FIG. 1 in which the auxiliary flywheel 18 rotates in the same direction as the rotational direction of the crankshaft 12. Besides, the resonance frequency of the accessories rotational vibration system is largely separate from the antiresonace frequency. Accordingly, a frequency range in which roll vibration reducing effect is obtained is enlarged thereby facilitating setting of the antiresonance frequency.

Figure 11:
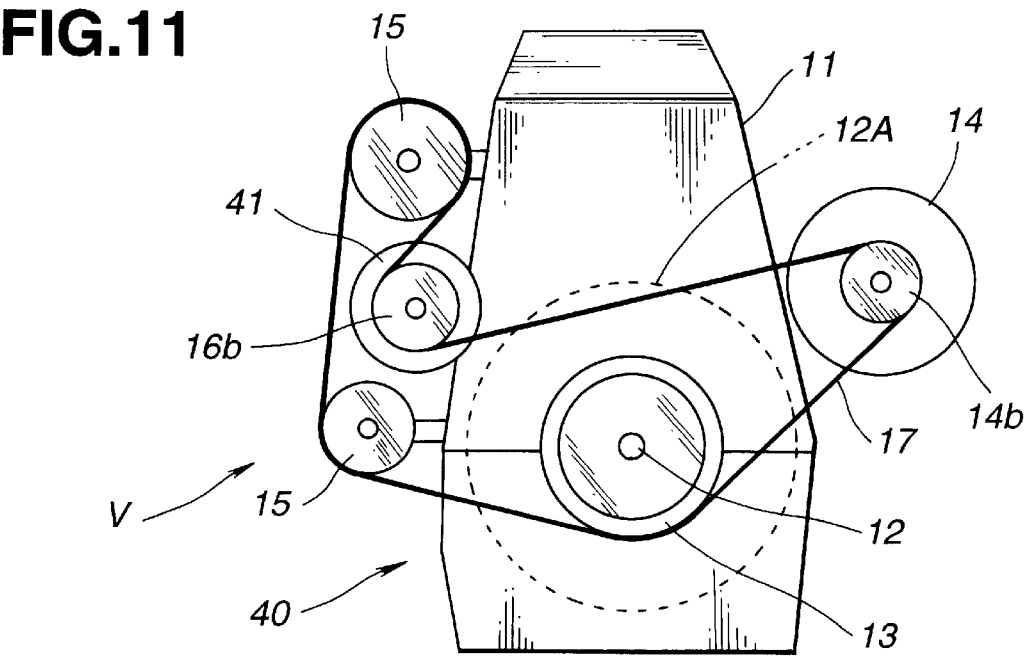
FIG. 11 is a schematic front elevation of an engine provided with a third embodiment of the vibration reducing system according to the present invention.

FIG. 11 illustrates an engine 40 provided with a third embodiment of the vibration reducing system V according to the present invention. The vibration reducing system V of this instance is similar to the second embodiment vibration reducing system shown in FIGS. 8 and 9 with the exception that the auxiliary flywheel 41 is fixedly mounted through an elastic member on the rotational shaft 16a of the power steering pump 16.

Figure 12:
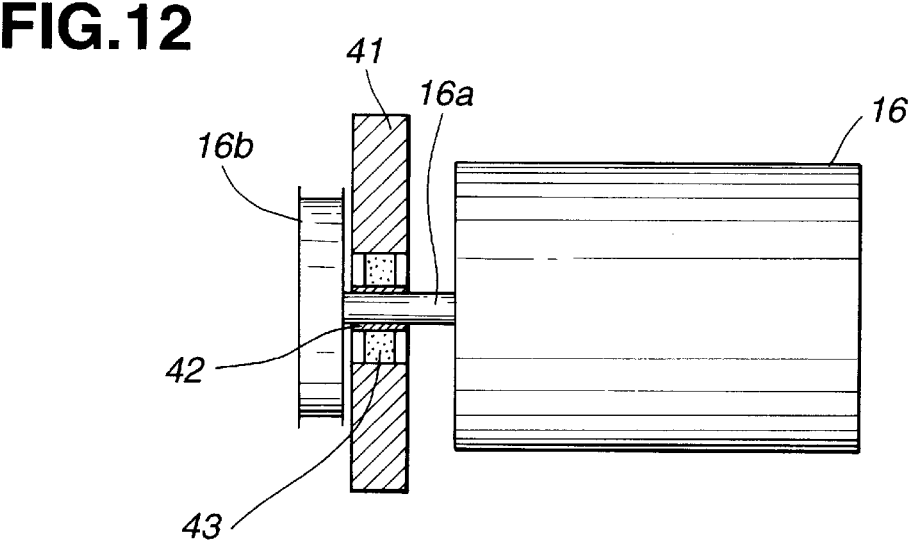
FIG. 12 is a schematic enlarged side view showing the connectional relationship between an auxiliary flywheel and an accessory of the engine of FIG. 11.
Figure 13:
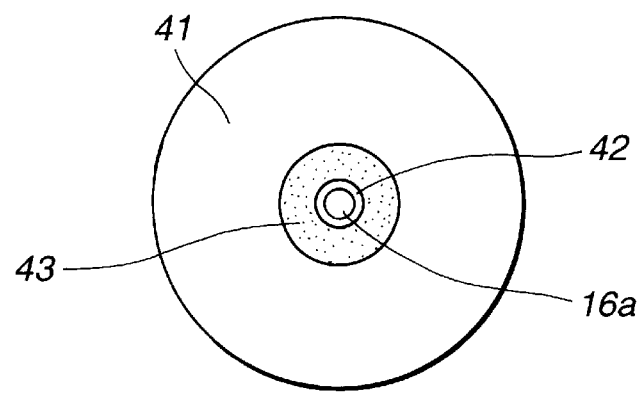
FIG. 13 is a schematic enlarged front view showing the connectional relationship of FIG. 12.

More specifically, in this instance, as shown in FIGS. 12 and 13, the power steering pump pulley 16b is directly fixedly mounted on the rotational shaft 16a. A cylindrical hub section 42 is fitted on the rotational shaft 16a of the power steering pump 16. An annular rubber 43 serving as the elastic member is securely mounted on the cylindrical hub section 42. An annular auxiliary flywheel 41 is securely mounted on the annular rubber 43. It will be understood that cylindrical hub section 42, the annular rubber 43 and the annular auxiliary flywheel 41 are coaxial with each other and with the rotational shaft 16a of the power steering pump 16. Thus, the annular auxiliary flywheel 41 is securely mounted through the annular rubber 43 on the rotational shaft 16a of the power steering pump 16.

Accordingly, in the accessories rotational vibration system, the annular rubber 43 serves as a spring component, and therefore freedom in setting the spring constant of the spring component is enlarged as compared with a case in which the accessories driving belt 17 serves as a spring component. Additionally, it is made possible to set the spring constant of the accessories driving belt 17 at such a high value as to be required for the inherent purpose of driving the engine accessories.

In the above-arranged vibration reducing system V, the antiresonance frequency f at which the antiresonace appears is represented by the following equation (4) which is given by using a rotational spring constant k of the annular rubber 43 in place of $k_1$, $k_2$, $f_1$, $f_2$ and the like in the equation (1) of the case where the accessories driving belt 17 is used as the spring component:

$$f = \frac{1}{2\pi} \sqrt{\frac{k(I_1 - \rho I_2)}{I_1 I_2}} \quad (4)$$

Here, similarly to the third embodiment, the moment of inertia $I_1$ of the main flywheel 12A, the moment of inertia $I_2$ of the auxiliary flywheel 18, a speed increasing ratio $\rho$ ($r_1/r_2$), and the spring constants k, and the like are set so as to cause the resonance frequency to be generally coincident with the frequency (25 Hz) of the 2nd harmonic component which is problematic in idling operating condition at an engine speed of 750 r.p.m. in the four-cylinder engine, thereby sharply reducing roll vibration of the engine 40.

Figure 14:
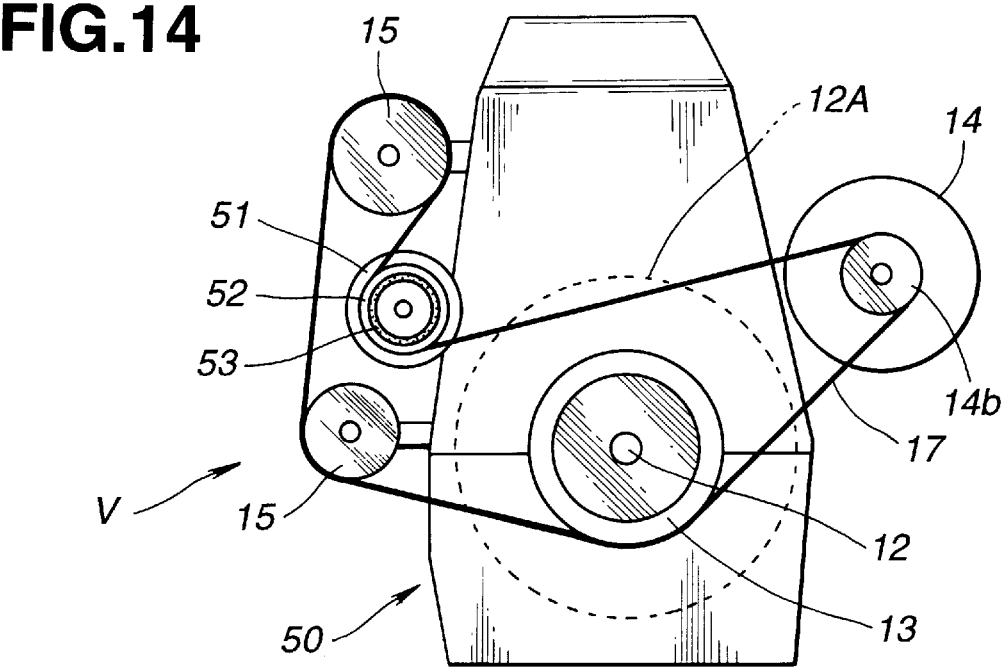
FIG. 14 is a schematic front elevation of an engine provided with a fourth embodiment of the vibration reducing system according to the present invention.
Figure 15:
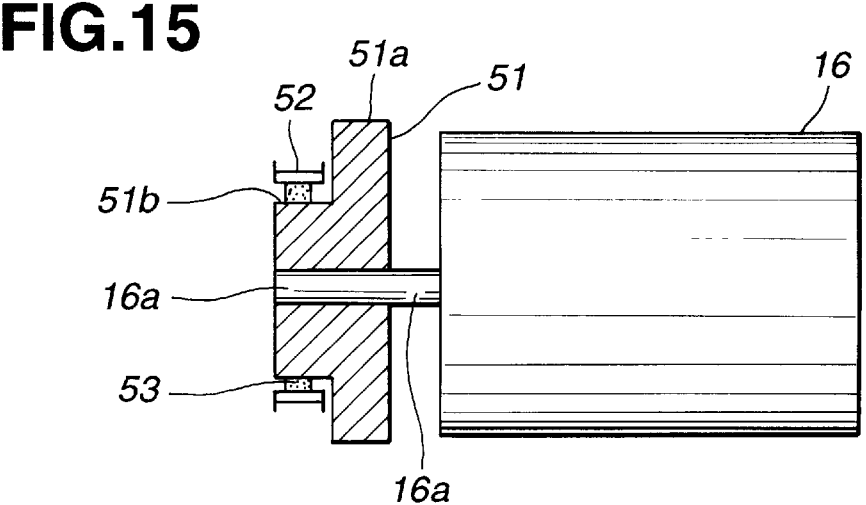
FIG. 15 is a schematic enlarged side view showing the connectional relationship between an auxiliary flywheel and an accessory of the engine of FIG. 14.
Figure 16:
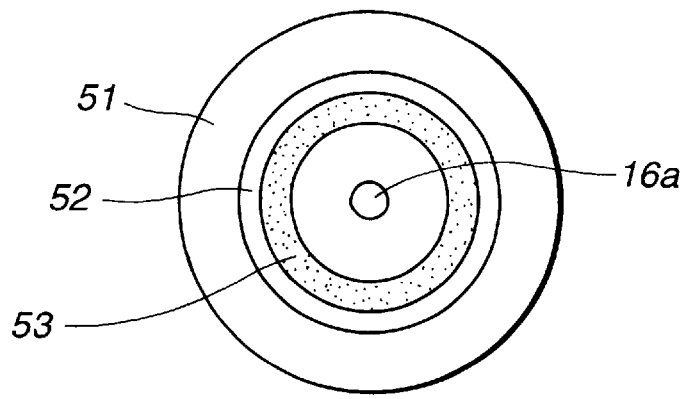
FIG. 16 is a schematic enlarged front view showing the connectional relationship of FIG. 15.

FIG. 14 illustrates an engine 50 provided with a fifth embodiment of the vibration reducing system V according to the present invention. The vibration reducing system V of this embodiment is similar to that of the third embodiment except for the structure of the power steering pump pulley and the auxiliary flywheel. In this instance, as shown in FIGS. 15 and 16, a driven pulley 52 serving also as the power steering pump pulley is connected through an annular elastic or elastomeric member 53 with the auxiliary flywheel 51, while the auxiliary flywheel 51 is directly fixedly mounted on the rotational shaft 16a of the power steering pump 16.

More specifically, the auxiliary flywheel 51 includes a large diameter section 51a, and a small diameter section 51b which are coaxial and integral with each other. The auxiliary flywheel 51 is fixedly and coaxially mounted on the rotational shaft 16a of the power steering pump 16. The driven pulley 52 is mounted on the peripheral surface of the small diameter section 51b of the auxiliary flywheel 51 through the elastic member or annular rubber 53 which is located between the small diameter section 51b and the driven pulley 52. It will be understood that the auxiliary flywheel 51, the drive pulley 52 and the annular rubber 53 are arranged coaxial with each other and with the rotational shaft 16a of the power steering pump 16.

In this instance, a rotatable section inherently included in the power steering pump 16 can serve as a part of the inertial mass member, and therefore the moment of inertia or the mass of the auxiliary flywheel 51 itself to be added can be decreased thereby accomplishing lightening of the engine by an amount corresponding to the decreased mass. Additionally, if the rotational spring constant k can be sufficiently lowered, it is possible to reduce roll vibration of the engine merely under the action of the inertial mass of the power steering pump 16 without providing an additional inertial mass. In this case, it is preferable to use the power steering pump 16 having a larger inertial mass, from the viewpoint of the fact that the power steering pump serves as an engine accessory.

Also in this instance, the resonance frequency f is represented generally by the above equation (4) similarly to the above instance and is set, for example, generally or around 25 Hz which is problematic in idling operating condition at an engine speed of 750 r.p.m. in the four-cylinder engine, thereby sharply reducing roll vibration of the engine 50, similarly to the above instances.

Figure 17:
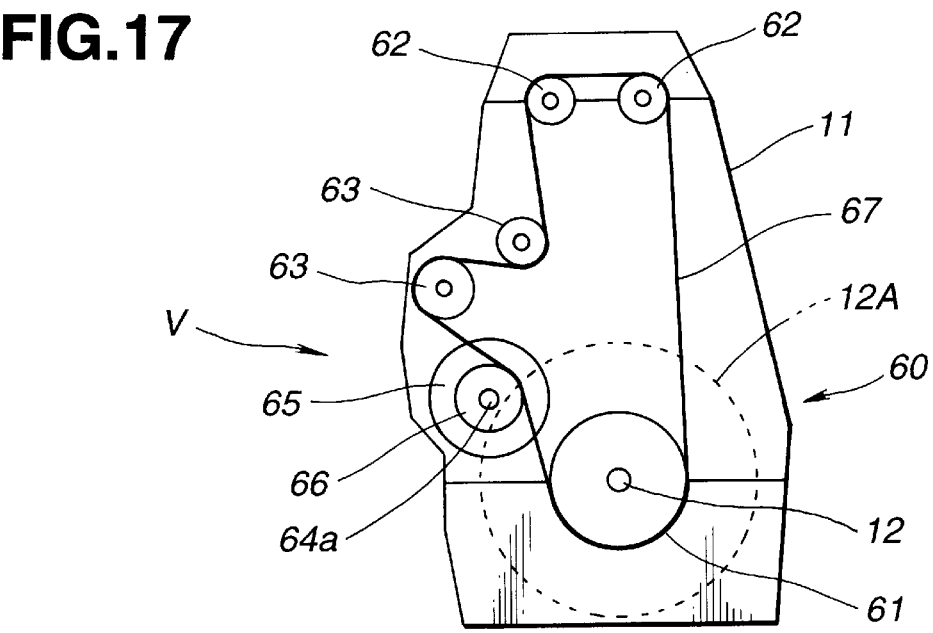
FIG. 17 is a schematic front elevation of an engine provided with a fifth embodiment of the vibration reducing system according to the present invention.

FIG. 17 illustrates an engine 60 provided with a fifth embodiment of the vibration reducing system V according to the present invention. The vibration reducing system V of this embodiment is similar to that of the first embodiment shown in FIG. 1. In this engine 60, a driving sprocket 61 is fixedly mounted on the front end section of the crankshaft 12 of the engine main body 11. Two sprockets 62, 62 are provided to drive camshafts (not shown) forming part of a valve operating system of the engine 60. An engine accessory (engine coolant pump) 64 is provided having a rotational shaft 64a on which an auxiliary flywheel 65 and a driven sprocket 66 are mounted. A driving chain 67 is engagingly passed on the driving sprocket 61, the sprockets 62, 62 and idler sprockets 63, 63, and further engagingly passed at its back side surface on the driven sprocket 66 for the engine accessory 64.

Figure 18:
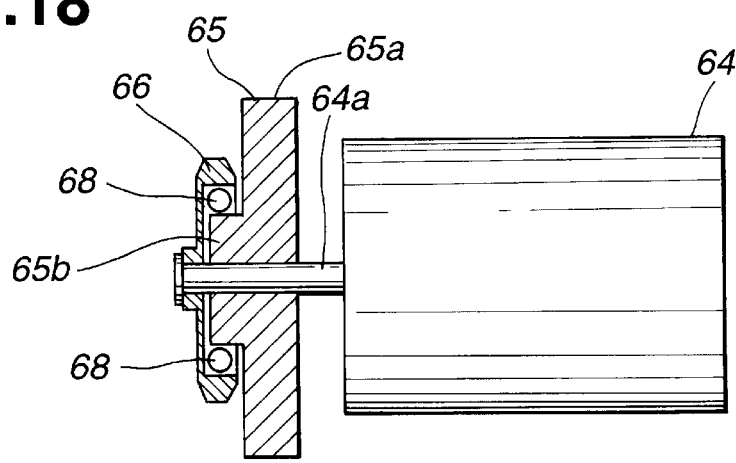
FIG. 18 is a schematic enlarged side view showing the connectional relationship between an auxiliary flywheel and an accessory of the engine of FIG. 17.
Figure 19:
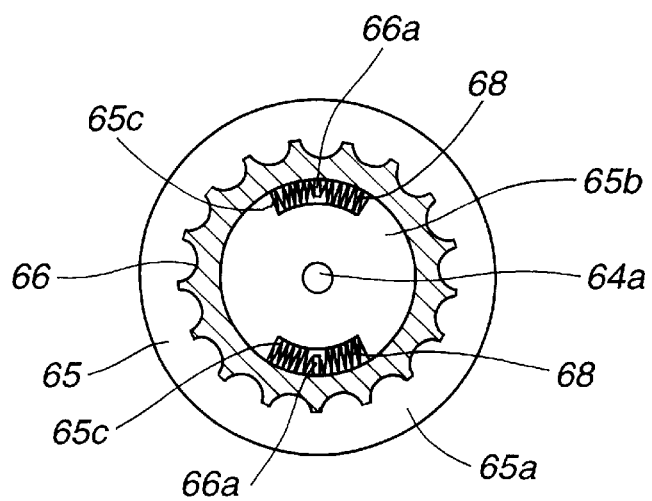
FIG. 19 is a schematic enlarged front view showing the connectional relationship of FIG. 18.

As shown in FIGS. 18 and 19, the auxiliary flywheel 65 is directly fixedly mounted on the front end section of the rotational shaft 64a of the accessory 64. The driven sprocket 66 is rotatably mounted on the front end section of the rotational shaft 64a. The auxiliary flywheel 65 has a large diameter section 65a, and a small diameter section 65b which are integral and coaxial with each other. The driven sprocket 66 is rotatably mounted around the small diameter section 65b in such a manner that the inner peripheral surface of the driven sprocket 66 is in slidable contact with the outer peripheral surface of the small diameter section 65b. The driven sprocket 66 is integrally formed with an annular wall section (no numeral) which is rotatably fitted on the rotational shaft 64a of the accessory 64. The small diameter section 65b is formed with generally arcuate elongate cutouts 65c which are located generally symmetrical with respect to the rotational shaft 64a. Each cutout 65c peripherally extends and opens to the outer peripheral surface of the small diameter section 65b. Two projection pieces 66a, 66a are formed projecting from the inner peripheral surface of the driven sprocket 66 and located generally symmetrical with respect to the rotational shaft 65a. The two projection pieces 66a, 66a project respectively into the elongate cutouts 65c, 65c of the small diameter section 65b of the auxiliary flywheel 65. Metal springs 68, 68 are disposed respectively in the cutouts 65c, 65c, so that the projection pieces 66a, 66a are connected respectively with the springs 68, 68. Accordingly, a rotational force of the driven sprocket 66 is transmitted through the springs 68, 68 to the auxiliary flywheel 65 and to the accessory 64.

The driving sprocket 61, the driven sprocket 66, the metal spring 68, the driving chain 67 and the like constitute the driving force transmitting mechanism for transmitting a rotational driving force from the crankshaft 12 to the inertial mass member 65.

In this instance, the auxiliary flywheel 65 rotates in an opposite direction to the rotational direction of the crankshaft 12, while the metal springs 68 serve as the spring component of the accessories rotational vibration system. Additionally, the auxiliary flywheel 65 and the rotational section of the accessory 64 serves as the inertial mass member, and therefore the mass of the auxiliary flywheel 65 itself to be added can be minimized. Further, the metal spring 68 serves as the spring component for the accessories rotational vibration system, and therefore deterioration and the like of the material of the spring component will not occur even when lubricating oil is supplied to the driving force transmitting mechanism so as to effect lubrication, thereby providing the advantages of preventing deterioration of rubber as compared with a case where rubber is used as the elastic member. As a result, reliability or durability of the vibration reducing system can be effectively maintained throughout a long time.

Also in this instance, the resonance frequency f is represented similarly by the above equation (4) using the rotational spring constant k of the metal springs 68, the speed increasing ratio $\rho$ ($=r_1/r_2$ where r1 is the effective radius of the driving sprocket 61; and $r_2$ is the effective radius of the driven sprocket 66). It will be understood that the above-mentioned "effective radius" means a radial distance between the center axis of a rotational member and the outer periphery (of the rotational member) corresponding to a pitch circle of a gear. The antiresonance frequency f is, for example, set generally or around 25 Hz which is problematic in idling operating condition at an engine speed of 750 r.p.m. in the four-cylinder engine, thereby sharply reducing roll vibration of the engine 60, similarly to the above instances.

Figure 20:
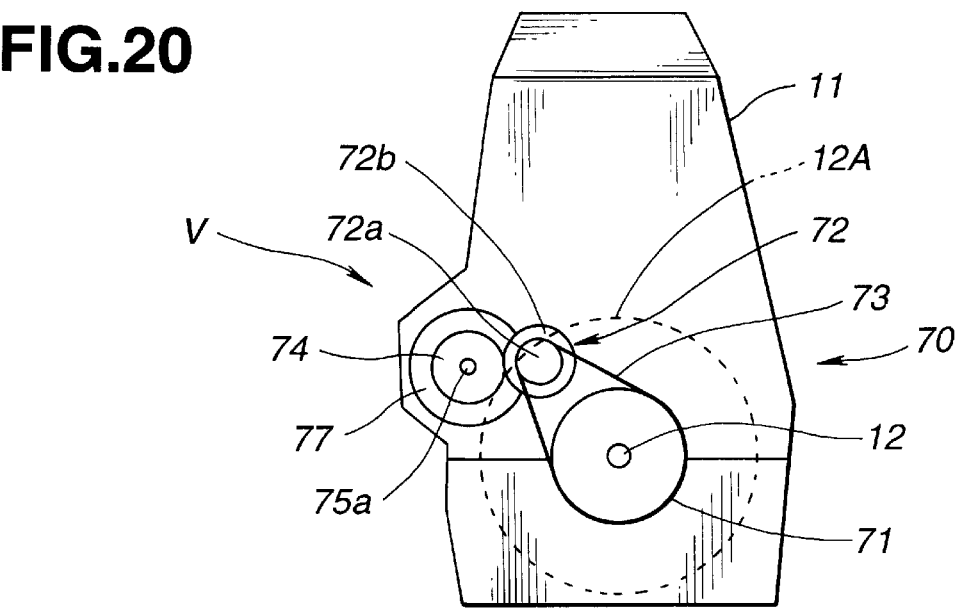
FIG. 20 is a schematic front elevation of an engine provided with a sixth embodiment of the vibration reducing system according to the present invention.

FIG. 20 illustrates an engine 70 provided with a sixth embodiment of the vibration reducing system V according to the present invention. The vibration reducing system V of this embodiment is similar to that of the fifth embodiment. In the engine 70, a driving sprocket 71 is fixedly mounted on the front end section of the crankshaft 12 of the engine main body 11. A sprocket and gear wheel 72 is rotatably provided including a sprocket section 72a and a gear section 72b which are coaxial and integral with each other. A driving chain 73 is passed on the driving sprocket 71 and the sprocket section 72a of the wheel 72 so that the wheel 72 is drivably connected with the driving sprocket 71.

Figure 21:
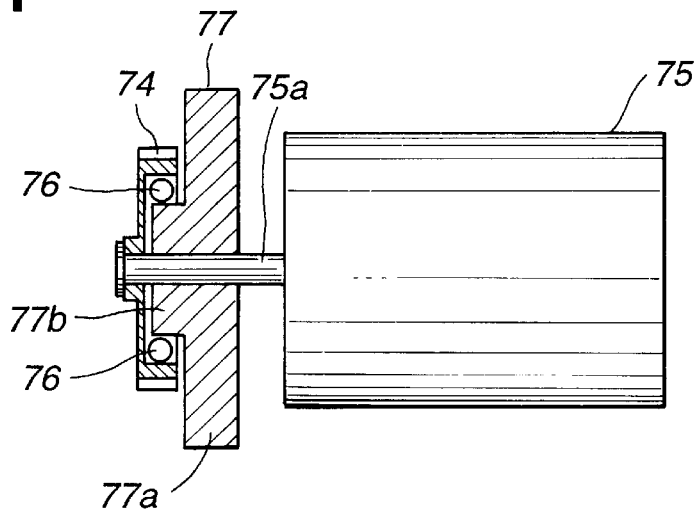
FIG. 21 is a schematic enlarged side view showing the connectional relationship between an auxiliary flywheel and an accessory of the engine of FIG. 20.
Figure 22:
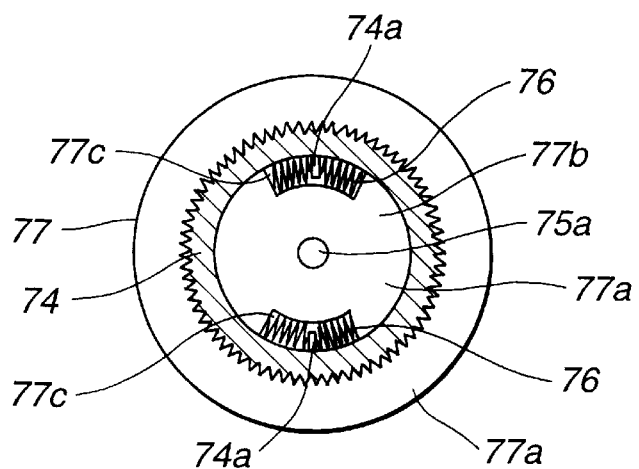
FIG. 22 is a schematic enlarged front view showing the connectional relationship of FIG. 21.

As shown in FIGS. 21 and 22, an auxiliary flywheel 77 is directly fixedly mounted on the front end section of the rotational shaft 75a of an engine accessory (engine coolant pump) 75. An annular driven gear 74 is rotatably supported on the front end section of the rotational shaft 64a through its annular wall section (no numeral). The auxiliary flywheel 77 has a large diameter section 77a, and a small diameter section 77b which are integral and coaxial with each other. The driven gear 74 is rotatably mounted around the small diameter section 77b in such a manner that the inner peripheral surface of the driven gear 74 is in sidable contact with the outer peripheral surface of the small diameter section 77b. The small diameter section 77b is formed with generally arcuate elongate cutouts 77c which are located generally symmetrical with respect to the rotational shaft 75a. Each cutout 77c peripherally extends and opens to the outer peripheral surface of the small diameter section 77b. Two projection pieces 74a, 74a are formed projecting from the inner peripheral surface of the driven gear 74 and located generally symmetrical with respect to the rotational shaft 75a. The two projection pieces 74a, 74a project respectively into the elongate cutouts 77c, 77c of the small diameter section 77b of the auxiliary flywheel 77. Metal springs 76, 76 are disposed respectively in the cutouts 77c, 77c, so that the projection pieces 74a, 74a are connected respectively with the springs 76, 76.

As seen in FIG. 20, the gear section 72b of the sprocket and gear wheel 72 is in engagement with the driven gear 74 for the accessory 75. Accordingly, a rotational force of the driven sprocket 74 is transmitted through the springs 76, 76 to the auxiliary flywheel 77 and to the rotational section of the accessory 75. It will be understood that the driving sprocket 71, the driving chain 73, a gear mechanism including the sprocket and gear wheel 72 and the driven gear 74, the metal springs 76 serving as elastic members, and the like constitute the driving force transmitting mechanism.

In this instance, the auxiliary flywheel 77 rotates in an opposite direction to the rotational direction of the crankshaft 12, while the metal springs 76 serve as the spring component of the accessories rotational vibration system. Additionally, the auxiliary flywheel 77 and the rotational section of the accessory 75 serve as the inertial mass member, and therefore the mass of the auxiliary flywheel 77 itself to be added can be minimized. Further, the metal spring 76 serves as the spring component for the accessories rotational vibration system, and therefore deterioration and the like of the material of the spring component will not occur even when lubricating oil is supplied to the driving force transmitting mechanism so as to effect lubrication, thereby providing the advantages of preventing deterioration of rubber as compared with a case where rubber is used as the elastic member. As a result, reliability or durability of the vibration reducing system can be effectively maintained throughout a long time.

Also in this instance, the resonance frequency f is represented similarly by the above equation (4) using the rotational spring constant k of the metal springs 76, the speed increasing ratio $\rho$ ($=r_1/r_2$ where $r_1$ is the effective radius of the driving sprocket 71; and $r_2$ is the radius of the pitch circle of the driven gear 74). The antiresonance frequency f is, for example, set generally or around 25 Hz which is problematic in idling operating condition at an engine speed of 750 r.p.m. in the four-cylinder engine, thereby sharply reducing roll vibration of the engine 70, similarly to the above instances.

Figure 23:
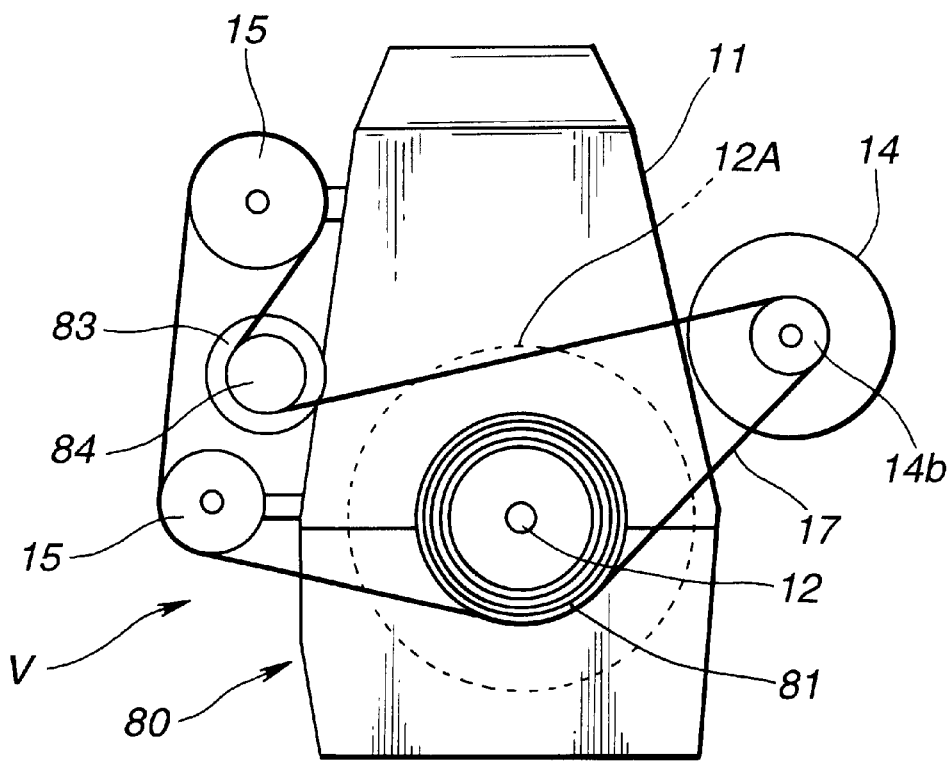
FIG. 23 is a schematic front elevation of an engine provided with a seventh embodiment of the vibration reducing system according to the present invention.

FIG. 23 illustrates an engine 80 provided with a seventh embodiment of the vibration reducing system V according to the present invention. The vibration reducing system V of this embodiment is similar to that of the second embodiment shown in FIG. 8 with the exception that a crankshaft pulley is provided with a spring component of the accessories rotational vibration system, and a dynamic damper for absorbing vibration of the crankshaft.

Figure 24:
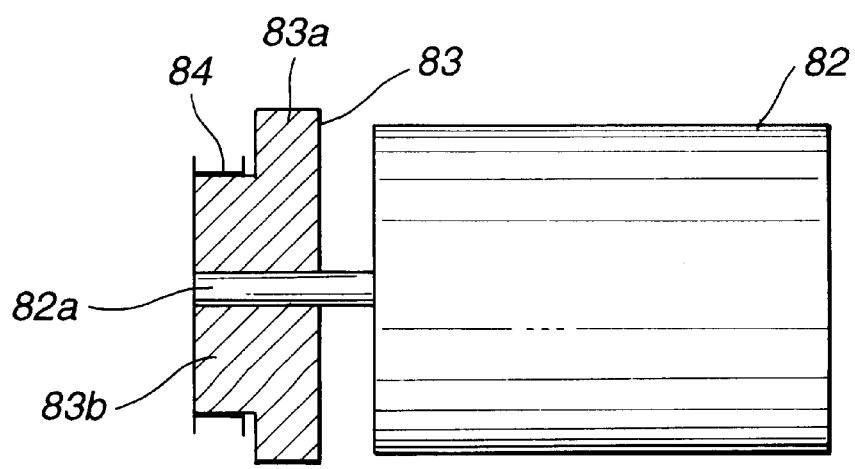
FIG. 24 is a schematic enlarged side view showing the connectional relationship between an auxiliary flywheel and an accessory of the engine of FIG. 23.

As shown in FIG. 24, a crankshaft pulley 81 is fixedly mounted on the front end section of the crankshaft 12 of the engine main body 11. The alternator 14 is provided including the alternator pulley 14b. The two idler pulleys 15 are provided in such a manner that a driven pulley 84 for driving an engine accessory (power steering pump) 82 is located between the two idler pulleys 15. The auxiliary flywheel 83 has a large diameter section 83a, and a small diameter section 83b which are coaxial and integral with each other. An auxiliary flywheel 83 is directly fixedly mounted on the rotational shaft 82a of the accessory 82. The driven pulley 84 is fixedly fitted on the outer peripheral surface of the small diameter section 83b so as to be coaxial with the small diameter section 83b.

Figure 25:
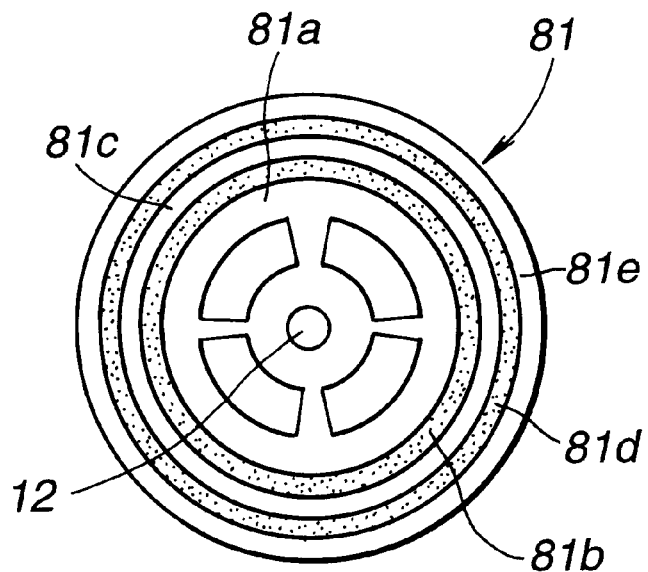
FIG. 25 is a schematic fragmentary enlarged sectional view of a crankshaft pulley of the engine of FIG. 23.
Figure 26:
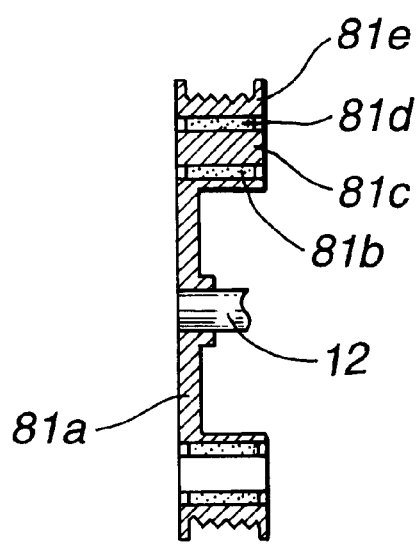
FIG. 26 is a schematic enlarged front view of the crankshaft pulley of FIG. 25.

As shown in FIGS. 25 and 26, the crankshaft pulley 81 includes an annular central connecting section 81a which is directly fixedly fitted on the front end section of the crankshaft 12. An inner annular rubber (or a second elastic member) 81b is bonded around the central connecting section 81a so as to be in contact with the outer peripheral surface of the central connecting section 81a. An annular mass section 81c is bonded around the inner annular rubber 81b so as to be in contact with the outer peripheral surface of the inner annular rubber 81b. An outer annular rubber (or a first elastic member) 81d is bonded around the annular mass section 81c so as to be in contact with the outer peripheral surface of the annular mass section 81c. Additionally, an annular pass-on section 81e is bonded around the outer annular rubber 81d so as to be in contact with the outer peripheral surface of the outer annular rubber 81d. Thus, the inner annular rubber 81b, the annular mass section 81c, the outer annular rubber 81d and the annular pass-on section 81e are laminated successively on the central connecting section 81a, thereby constituting the crankshaft pulley 81 of the laminated body.

The accessories driving belt 17 is passed on the pass-on section 81e of the crankshaft pulley 81, the alternator pulley 14b, the driven pulley 84 on the auxiliary flywheel 83, and the two idler pulleys 15, 15, in which the accessories driving belt 17 is passed at its back surface on the driven pulley 84.

In the crankshaft pulley 81, the inner annular rubber 81b and the annular mass section 81c constitute a dynamic damper for absorbing vibration (mainly torsional resonance vibration) of the crankshaft 12. The outer annular rubber 81d serves as a spring component of the accessories rotational vibration system to which a rotational force is supplied through the accessories driving belt 17.

Also in this instance, the resonance frequency f is represented similarly by the above equation (4) by using the rotational spring constant k of the outer annular rubber 81d. The antiresonance frequency f is, for example, set generally or around 25 Hz which is problematic in idling operating condition at an engine speed of 750 r.p.m. in the four-cylinder engine, thereby sharply reducing roll vibration of the engine 80, similarly to the above instances.

In this arrangement, a torsional resonance frequency of the crankshaft 12 is usually several hundreds Hz, and therefore the spring constant of the inner annular rubber 81b serving as the dynamic damper is set much larger than the spring constant k of the outer annular rubber 81d serving as a spring component of the accessories rotational vibration system.

Accordingly, the inner annular rubber 81b serves generally as a rigid body around the (lower) resonance frequency of the accessories rotational vibration system, so that the annular mass section 81c rotates together with central connection section 81a fixed on the crankshaft 12 as a single body. Around the torsional resonance frequency of the crankshaft 12, the accessories rotational vibration system including the pass-on section 81e is isolated from vibration of the crankshaft 12 because the spring constant k of the outer annular rubber 81d is sufficiently low, and therefore the inner annular rubber 81b and the annular mass section 81c serve as the dynamic damper thereby suppressing particularly the torsional resonance vibration of the crankshaft 12. Thus, in this instance, both resonance vibration of the crankshaft 12 and roll vibration, for example, during idle operation of the engine can be reduced. It will be understood that the above dynamic damper may be configured to absorb not only the torsional vibration of the crankshaft 12 but also the flexural vibration of the crankshaft 12.

While the auxiliary flywheel 18, 41, 51, 65, 77, 83 serving as the inertial mass member has been shown and described as being rotated in the opposite direction to the rotational direction of the crankshaft 12 in the second to seventh embodiments, it will be appreciated that the auxiliary flywheel may be rotated in the same direction as the rotational direction of the crankshaft 12, in which the antiresonace frequency f is represented by the following equation (5):

$$f = \frac{1}{2\pi}\sqrt{\frac{k(I_1 + \rho I_2)}{I_1 I_2}} \quad (5)$$

The antiresonance frequency f given by the equation (5) is set to be generally coincident with frequencies of vibrations caused under engine operating conditions in which roll vibration of the engine is problematic, thereby effectively reducing roll vibration of the engine similarly to the above-discussed instances.

Figure 27:
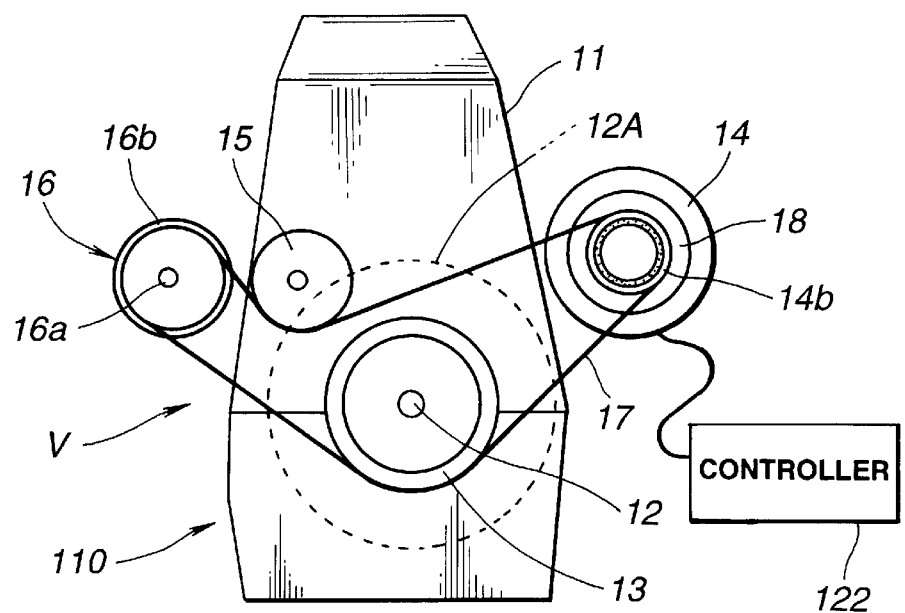
FIG. 27 is a schematic front elevation of an engine provided with an eighth embodiment of the vibration reducing system according to the present invention.

FIG. 27 illustrates an engine 110 provided with an eighth embodiment of the vibration reducing system V according to the present invention. This vibration reducing system V is similar to that of the first embodiment shown in FIG. 1. The engine 110 is similar to that shown in FIG. 1 and includes an engine main body 11 which has a crankshaft 12 through which driving force is generated. The crankshaft 12 has its front end section which projects out of the front end of the engine main body 11. A crank pulley 13 is fixedly mounted on the front end section of the crankshaft 12. A main flywheel 12A is fixedly mounted on the rear end section of the crankshaft 12 which end section is projected out of the rear end of engine main body 11. An alternator 14 and a power steering pump 16 forming part of a power steering system are provided as engine accessories to the engine main body 11. The alternator 14 has its rotational shaft 14a on which an alternator pulley 14b is mounted through an auxiliary flywheel 18 and the like. The alternator pulley 14b is drivably connected with the crank pulley 13 through an elastic belt 17 for driving the engine accessories. The belt 17 is passed on the crankshaft pulley 13 and the alternator pulley 14b and additionally on an idler pulley 15 and a pulley 16b of the power steering pump 16, so that a rotational driving force of the crankshaft 12 is transmitted to the alternator 14, the power steering pump 16, and the like.

Figure 28:
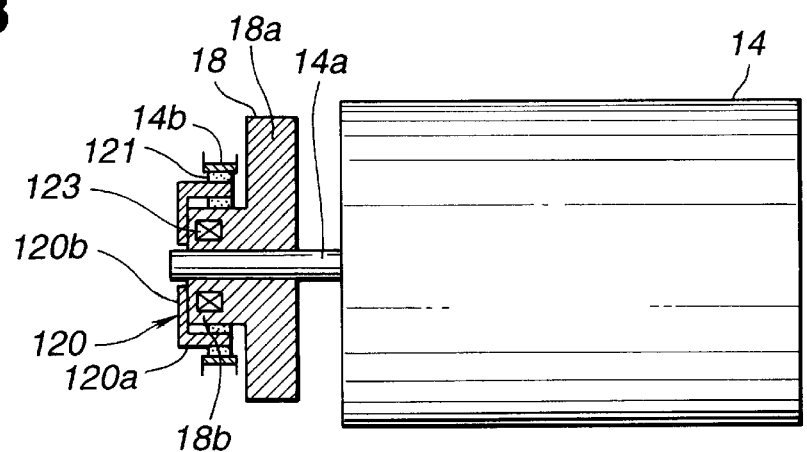
FIG. 28 is a schematic enlarged side view showing the connectional relationship between an auxiliary flywheel and an accessory of the engine of FIG. 27.

As shown in FIG. 28, the auxiliary flywheel 18 serving as an inertial mass member is fixedly mounted on the rotational shaft 14a of the alternator 14. The auxiliary flywheel 18 has a large diameter section 18a, and a small diameter section 18b which are coaxial and integral with each other. An inner annular rubber (or first elastic member) 119 is securely mounted or bonded on the outer peripheral surface of the small diameter section 18b. A generally cup-shaped clutch plate 120 has a cylindrical section 120a, and an annular disc section 120b. The cylindrical section 120a is securely mounted on or bonded to the outer peripheral surface of the inner annular rubber 119. Additionally, an outer annular rubber (or second elastic member) 121 is securely mounted on or bonded to the outer peripheral surface of the cylindrical section 120a of the clutch plate 120. The alternator pulley (or driven pulley) 14b is securely mounted on or bonded to the outer peripheral surface of the outer annular rubber 121. The inner and outer annular rubbers 119, 121 constitute an elastic body (no numeral) which serves as a spring component of the accessories rotational vibration system.

An electromagnet 123 is embedded in the small diameter section 18b of the auxiliary flywheel 18 and arranged to be controlled to be switched ON and OFF upon receiving signals from a controller 122. When the electromagnet 123 is energized upon receiving a signal from the controller 122, the electromagnet 123 is operated to attract the clutch plate 120 so as to restrain the inner annular rubber 119 from deformation. When the electromagnet 123 is de-energized upon receiving another signal from the controller 122, the clutch plate 120 is released so as to allow the inner annular rubber 119 to deform.

It will be understood that the crankshaft pulley 13, the alternator pulley 14b, the first and second elastic members 119, 121, the accessories driving belt 17 and the like constitute the driving force transmitting mechanism for transmitting the rotational force of the crankshaft 12 to the auxiliary flywheel 18 serving as the inertial mass member. Additionally, an electromagnetic clutch mechanism including the clutch plate 120 and the electromagnet 123, the controller 122 and the like constitute a spring constant variably controlling device which variably controls the spring constant of the elastic members 119, 120 serving as spring components of the accessories rotational vibration system.

In the above-arranged engine 110, roll vibration occurs when the engine operates to rotate the crankshaft 12, thus forming a roll vibration system which has inherent or certain resonance frequencies. Additionally, rotational vibration occurs when the engine accessories are driven under the rotational force transmitted from the crankshaft 12, thus forming a rotational vibration system of the engine accessories. The accessories rotational vibration system has inherent or certain resonance frequencies. The accessories rotational vibration system has a spring component constituted of the inner annular rubber (or first elastic member) 119 and the outer annular rubber (or second elastic member) 121, and a mass component constituted of the auxiliary flywheel 18, a rotor section of the alternator 14, rotational sections (including the crankshaft pulley 13, the crankshaft 12, the main flywheel 12A, and the like) of the engine main body 11. It will be understood that there exits an engine operating region in which an antiresonance occurs between the accessories rotational vibration system and the roll vibration system which are influenced with each other. In the antiresonance, the vibration modes of the accessories rotational vibration system and the roll vibration system are opposite in phase and cancelled with each other.

In the above engine 110, the spring constants of the first and second elastic members 119, 121 are adjusted in such a manner that the antiresonance appears in an engine operating range (for example, idling operating condition) or engine operating ranges in which the engine is frequently operated at predetermined engine speeds while roll vibration is problematic.

Here, on the assumption that $I_1$ is a moment of inertia of a rotational system (including the crankshaft pulley 13, the crankshaft 12, the main flywheel 12A, and the like) of the engine body 11; $I_2$ is a moment of inertia of the auxiliary flywheel 18 or a body including the auxiliary flywheel 18 and the rotor section of the alternator 14; $\rho$ is a speed increasing ratio (=$r_1/r_2$ where $r_1$ is an effective radius of the crankshaft pulley 13; and $r_2$ is a driven radius of the auxiliary flywheel 18 (an effective radius of the driven pulley 14b); and k is a rotational spring constant (spring constant in a rotational direction) of the elastic body (119, 121), the antiresonace frequency at which the antiresonance appears is given by the above-mentioned equation (5).

It will be understood that the above-mentioned "effective radius" means a radial distance between the axis of a rotational member and the outer peripheral surface at which the accessories driving belt 17 contacts.

This antiresonance frequency f is represented as a frequency at which a vibration mode 1 of the roll vibration system and a vibration mode 2 of the accessories rotational vibration system are opposite in phase so as to cancel the vibration modes 1 and 2 with each other, as shown in FIG. 5.

Accordingly, the spring constant of the elastic body (119, 121) forming part of the accessories rotational vibration system is variably controlled such that the antiresonance frequency becomes generally coincident with one of frequencies which are obtained respectively by multiplying an engine-revolutional frequency fn (=N/60) at a predetermined engine speed N (r.p.m.) by values each of which is represented by (a natural number/2) or 0.5, 1, 1.5, 2, 2.5, 3, . . . It will be understood that the engine speed corresponds to the revolution speed (r.p.m.) of the crankshaft 12. More specifically, in case of a four-cylinder engine, roll vibrations caused by the frequency components such as the 2nd harmonic component, the 4th harmonic component, the 6th harmonic component, . . . and the like of the engine speed become large. In case of a six-cylinder engine, roll vibrations caused by the frequency components such as the 3rd harmonic component, the 6th harmonic component, . . . and the like of the engine speed becomes large. In case of an eight-cylinder engine, roll vibrations caused by the frequency components such as the 4th harmonic component, the 8th harmonic component, . . . and the like of the engine speed become large. Accordingly, by variably controlling the spring constant of the elastic body such that the above-mentioned antiresonance frequency f becomes generally coincident with either one of the frequency components or harmonic components, the roll vibration of the engine can be reduced under a plurality of engine operating conditions.

Additionally, in case that there is irregularity in combustion among a plurality of cylinders, roll vibrations caused by frequency components such as the 0.5th harmonic component, the 1st harmonic component, the 1.5th harmonic component, . . . and the like are generated. Therefore, by variably controlling the spring constant of the elastic body such that the above-mentioned antiresonance frequency f becomes generally coincident with either one of such frequency components, roll vibrations of the engine can be similarly reduced.

In this instance, a composite spring constant ($k_1k_2/(k_1+k_2)$) of the rotational spring constant $k_1$ of the inner annular rubber 119 (first elastic member) and the rotational spring constant $k_2$ of the outer annular rubber (second elastic member) 121 is set such that the above-mentioned antiresonance frequency f is generally coincident with the frequency obtained by multiplying the engine-revolutional frequency at an idling engine speed (a first predetermined engine speed) by a value represented by (the number of cylinders of the engine/2). Additionally, the rotational spring constant $k_2$ of the outer annular rubber (second elastic member) 121 is set such that the above-mentioned antiresonance frequency f is generally coincident with the frequency obtained by multiplying the engine-revolutional frequency at a high idling engine speed (a second predetermined engine speed) by a value represented by (the number of engine cylinders/2).

It will be understood that, of various frequency components or harmonic components, (a number of cylinders of the engine/2)th harmonic component is particularly large. More specifically, the 2nd harmonic component is the largest in case of the four-cylinder engine; the 3rd harmonic component is the largest in case of the six-cylinder engine; and the 4th harmonic component is the largest in the eight-cylinder engine. Therefore, roll vibration of the engine can be reduced by setting the spring constants $k_1$, $k_2$ of the inner and outer annular rubbers 119, 121 in such a manner that the above antiresonance frequency f is generally coincident with the frequency of the harmonic component.

Here, an example of the process for reducing roll vibration in accordance with the principle of the eighth embodiment will be discussed. In case of the four-cylinder gasoline-fueled engine having idling engine speed (the first predetermined engine speed $N_1$) of 750 r.p.m., the composite spring constant ($k_1k_2/(k_1+k_2)$) of the rotational spring constant $k_1$ of the inner annular rubber 119 (first elastic member) and the rotational spring constant $k_2$ of the outer annular rubber (second elastic member) 121 is so set as to cause the antiresonance frequency f to be generally coincident with the 2nd harmonic component of engine speed, i.e., 25 Hz ((750/60)×2). Additionally, in case that the four-cylinder gasoline-fueled engine has the high idling engine speed (the second predetermined engine speed $N_2$) of 1000 r.p.m., the spring constant $k_2$ of the outer annular rubber 121 is so set as to cause the antiresonance frequency f to be generally coincident with the 2nd harmonic component of engine speed, i.e., 33 Hz ((1000/60)×2).

Figure 30:
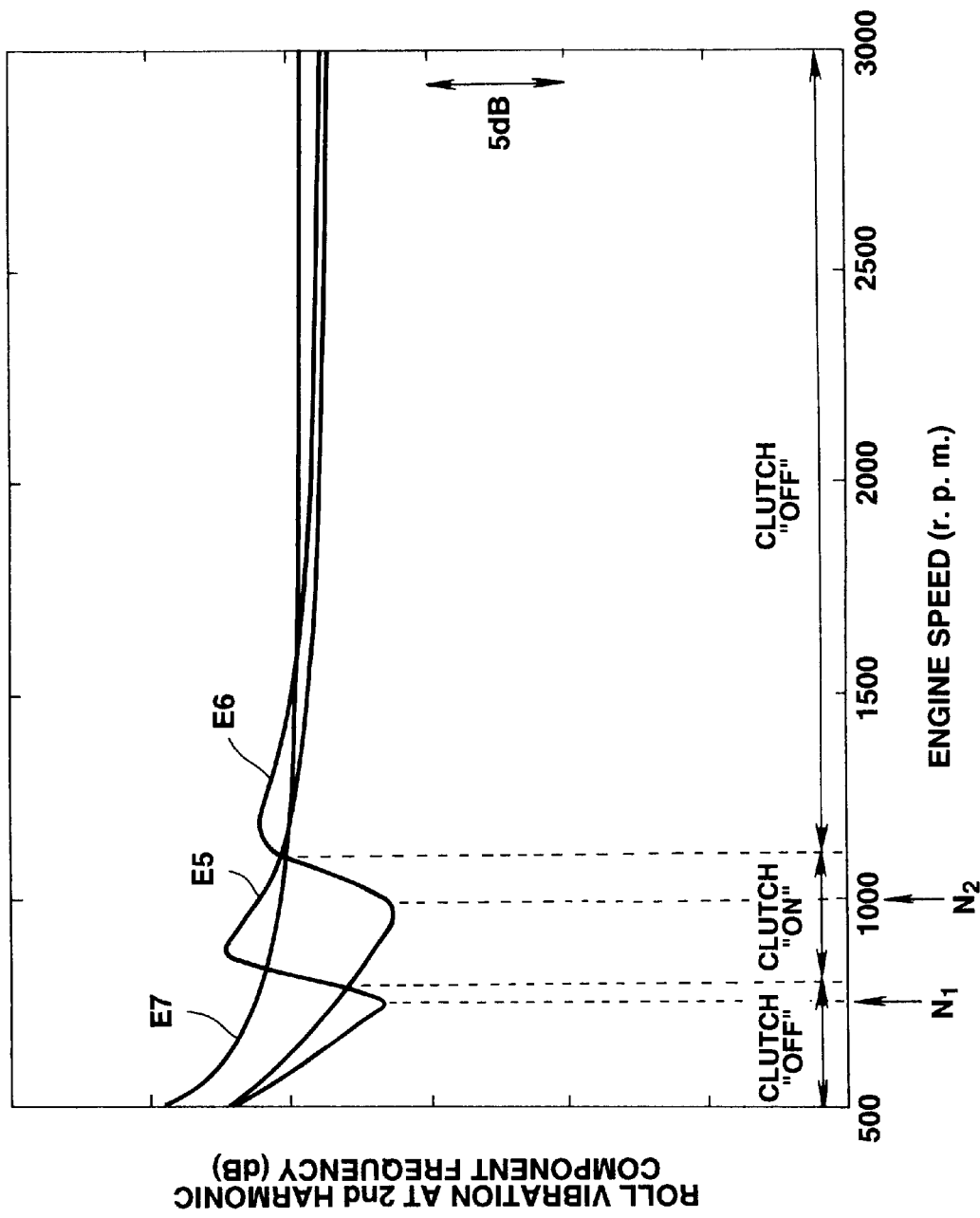
FIG. 30 is a graph showing a vibration reduction characteristics of the engine of FIG. 27.

With the thus arranged vibration reducing system V of this embodiment, first when the engine 110 is in an engine speed range up to about 810 r.p.m. and containing the idling engine speed of 750 r.p.m., current supply to the electromagnet 123 is interrupted under the action of the signal from the controller 122 so that the electromagnetic clutch mechanism 120, 123 is brought into its inoperative state (or switched OFF). Accordingly, when the engine is in an idling condition in which the engine speed is around 750 r.p.m., the inner annular rubber 19 is allowed to deform so that not only the outer annular rubber 121 but also the inner annular rubber 119 serve as the spring components. As a result, the first antiresonance appears corresponding to the composite spring constant ($k_1k_2/(k_1+k_2)$) of the inner annular rubber 119 (first elastic member) and the outer annular rubber (second elastic member) 121 as shown in FIG. 30 in which a curve E5 indicates a roll vibration characteristics of the engine 110 provided with the vibration reducing system V under a condition in which the clutch mechanism 120, 123 is switched OFF; a curve E6 indicates a roll vibration characteristics of the engine 110 provided with the vibration reducing system V under a condition in which the clutch mechanism is switched ON; and a curve E7 indicates a roll vibration characteristics of a conventional engine similar to the engine 110 with the exception that no auxiliary flywheel 18 is provided. FIG. 30 reveals that the engine 110 can be lowered in roll vibration under an idling condition of the engine as compared with the conventional engine.

When the engine 110 is in another engine speed range of from about 810 r.p.m. to about 1100 r.p.m. and containing the high idling engine speed of 1000 r.p.m., current supply to the electromagnet 123 is made under the action of the signal from the controller 122 so that the electromagnetic clutch mechanism 120, 123 is put into its operative state (or switched ON). Accordingly, the inner annular rubber 119 is restrained from its deformation, and therefore only the outer annular rubber 121 serves as an elastic member or spring component. As a result, when the engine is in a high idling condition where the engine speed is around 1000 r.p.m., the second antiresonance appears corresponding to the rotational spring constant k2 of the outer annular rubber 121, as indicated by the curve E6 in FIG. 30 which reveals that roll vibration can be lowered as compared with the conventional engine whose characteristics is indicated by the curve E7 and with the engine 110 (whose characteristics is indicated by the curve E5) in which the electromagnetic clutch mechanism 120, 123 is in its inoperative state.

Further, when the engine 110 is in an engine speed range over about 1100 r.p.m., current supply to the electromagnet 123 is interrupted so as to put the electromagnetic clutch mechanism 120, 123 into its inoperative state (or switched OFF). Accordingly, both the inner and outer annular rubbers 119, 121 serve as the elastic members or spring components, similarly to the above case. As a result, the resonance frequency of the accessories rotational vibration system is shifted to a lower engine speed side (from about 1200 r.p.m. to about 880 r.p.m.), thereby preventing degradation in roll vibration due to resonance vibration of this accessories rotational vibration system. Accordingly, roll vibration can be effectively lowered as shown in FIG. 30, under the action of the auxiliary flywheel 18 serving as an inherent torque balancer.

As appreciated from the above, in this instance with the eighth embodiment of the vibration reducing system V, roll vibration can be effectively lowered throughout a wide engine operating region by variably controlling the rotational spring constant of the accessories rotational vibration system at two-stage values under ON-OFF operation of the electromagnetic clutch mechanism. While the vibration reducing system V has been shown and described as being set such that the antiresonance appears around the idling engine speed $N_1$ and around the high idling engine speed $N_2$ in the embodiment, it will be understood that the vibration reducing system V may be set such that the antiresonance appears around a so-called fast idling engine speed of about 1500 r.p.m.

Another example of the process for reducing roll vibration in accordance with the principle of this embodiment will be discussed in connection with the series type hybrid drive vehicle 121 on which the engine 110 provided with the vibration reduction system V of the present invention is mounted, as shown in FIG. 7. In this hybrid drive vehicle 121, the engine 110 is used for driving the alternator 14 to generate electric power and serves only as a driving source for the alternator 14. Electric power generated by the alternator 14 is supplied through a battery 22 to an electric motor 23. The electric motor 23 drives road wheels 25, 25 through a transmission 24. Accordingly, the engine 110 is not required to directly drive the road wheels 25, 25 and therefore is operated at a constant engine speed under an engine operating condition where engine operational efficiency is the highest.

In this hybrid drive vehicle 121, two engine operating conditions (engine speeds) are set in accordance with required amounts of power generation. In case that the two engine speeds are respectively 2000 r.p.m. and 3000 r.p.m. in the engine 110 of the four-cylinder type, the composite spring constant ($k_1k_2/(k_1+k_2)$) of the inner annular rubber 119 and the outer annular rubber 121 is set such that the first antiresonance appears around the frequency of the 2nd harmonic component at the engine speed of 2000 r.p.m., i.e., 67 Hz (($2000/60)\times 2$). Additionally, the rotational spring constant $k_2$ of the outer annular rubber 121 is set such that the second antiresonance appears around the frequency of the 2nd harmonic component at the engine speed of 3000 r.p.m., i.e., 100 Hz (($3000/60)\times 2$).

With the above-arranged hybrid drive vehicle 121, when the engine 110 is operated under the condition of the engine speed of 2000 r.p.m., the electromagnetic clutch mechanism 120, 123 is put into its inoperative state (or switched OFF) under the action of the signal from the controller 122. When the engine 110 is operated under the condition of the engine speed of 3000 r.p.m., the electromagnetic clutch mechanism 120, 123 is put into its operative state (switched ON) under the action of the signal from the controller 122. As a result, roll vibration can be effectively reduced under both the engine operating conditions.

Figure 31:
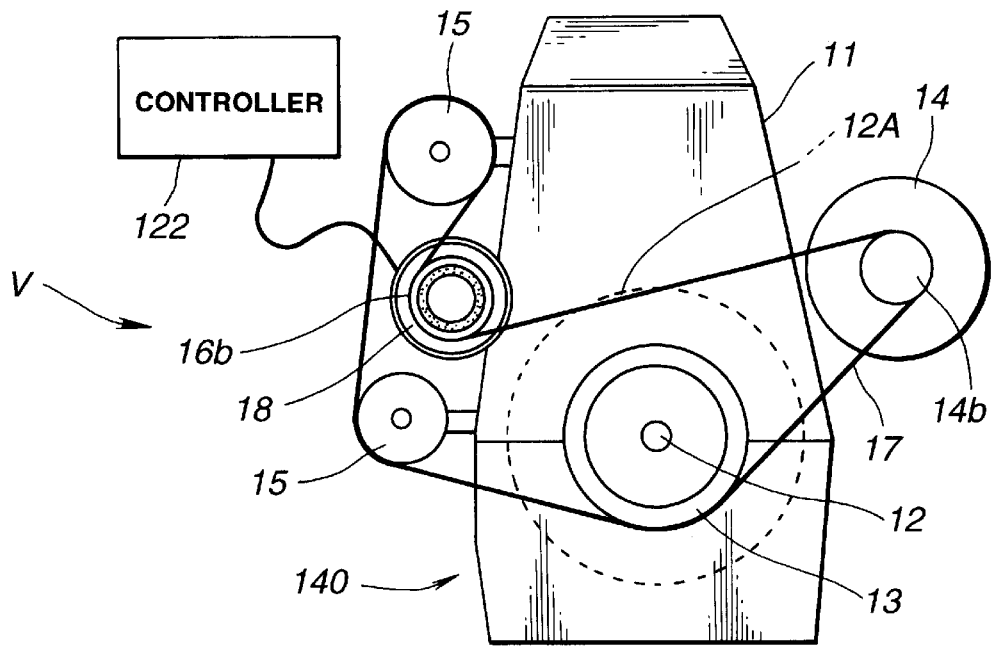
FIG. 31 is a schematic front elevation of an engine provided with a ninth embodiment of the vibration reducing system according to the present invention.

FIG. 31 illustrates an engine 140 provided with a ninth embodiment of the vibration reducing system V according to the present invention. The engine 140 of this instance is similar to that in FIG. 27 and includes the crankshaft pulley 13 fixedly mounted on the front end section of the crankshaft 12. The alternator 14 has the alternator pulley 14b. Two idler pulleys 15, 15 are provided so that the power steering pump pulley 16b is located between them. The accessories driving belt 17 is passed on the crankshaft pulley 13, the alternator pulley 14b and the idler pulleys 15, 15, and passed at its back surface on the power steering pump pulley 16b, so that the power steering pump pulley 16b is drivably connected with the crankshaft pulley 13.

Figure 32:
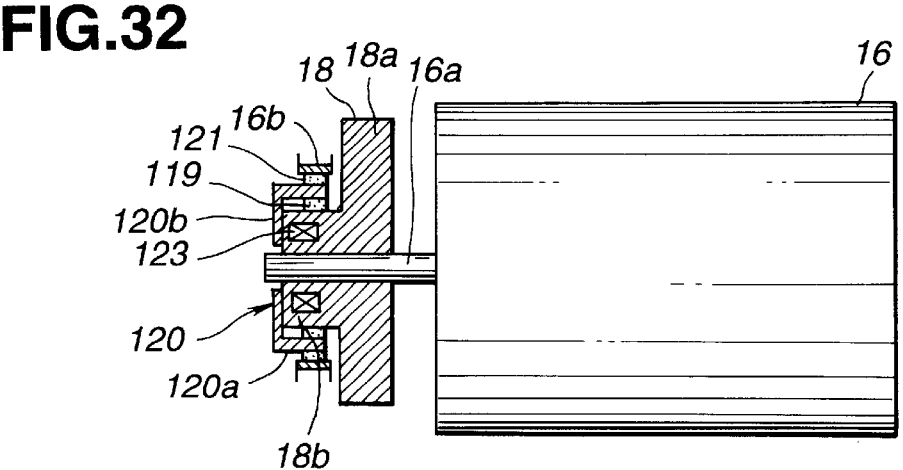
FIG. 32 is a schematic enlarged side view showing the connectional relationship between an auxiliary flywheel and an accessory of the engine of FIG. 31.
Figure 33:
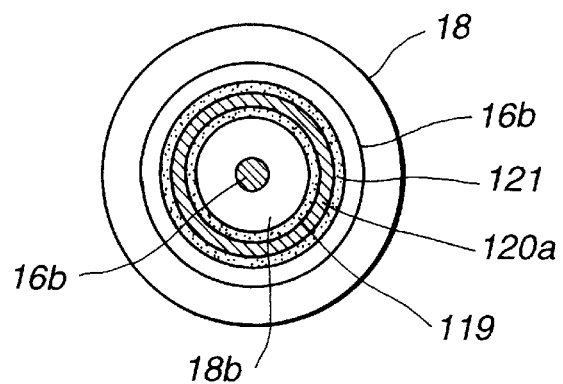
FIG. 33 is a schematic enlarged front view showing the connectional relationship of FIG. 32.

As illustrated in FIGS. 32 and 33, the auxiliary flywheel 18 serving as an inertial mass member is fixedly mounted on the rotational shaft 16a of the power steering pump 16. The auxiliary flywheel 18 has a large diameter section 18a, and a small diameter section 18b which are coaxial and integral with each other. An inner annular rubber (or first elastic member) 119 is securely mounted or bonded on the outer peripheral surface of the small diameter section 18b. A generally cup-shaped clutch plate 120 has a cylindrical section 120a, and an annular disc section 120b. The cylindrical section 120a is securely mounted on or bonded to the outer peripheral surface of the inner annular rubber 119. Additionally, an outer annular rubber (or second elastic member) 121 is securely mounted on or bonded to the outer peripheral surface of the cylindrical section 120a of the clutch plate 120. The power steering pump pulley (or driven pulley) 16b is securely mounted on or bonded to the outer peripheral surface of the outer annular rubber 121, thereby functioning to supply a rotational driving force to the auxiliary flywheel 18 and to the rotational section of the power steering pump 16. The inner and outer annular rubbers 119, 121 constitutes an elastic body (no numeral) which serves as a spring component of the accessories rotational vibration system.

An electromagnet 123 is embedded in the small diameter section 18b of the auxiliary flywheel 18 and arranged to be controlled to be switched ON and OFF upon receiving signals from the controller 122. The electromagnet 123 and the clutch plate 120 constitute an electromagnetic clutch mechanism (not identified). When the electromagnet 123 is energized upon receiving a signal from the controller 122, the electromagnet 123 is operated to attract the clutch plate 120 so as to restrain the inner annular rubber 119 from deformation. When the electromagnet 123 is de-energized upon receiving another signal from the controller 122, the clutch plate 120 is released so as to allow the inner annular rubber 119 to deform.

In this instance, the auxiliary flywheel 18 rotates in the opposite direction of the rotational direction of the crankshaft 12, as opposed to the case shown in FIG. 27. In this instance, the antiresonance frequency f is given by the above-mentioned equation (4).

Figure 29:
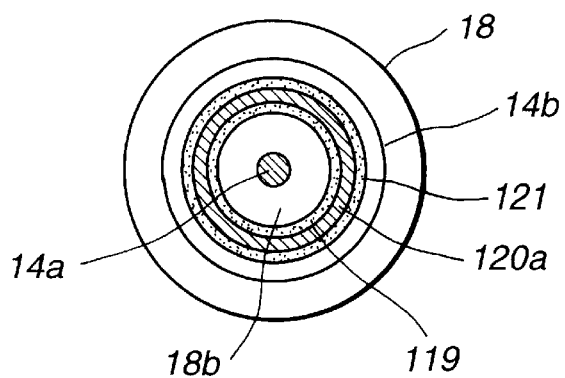
FIG. 29 is a schematic enlarged front view showing the connection relationship of FIG. 28.

Accordingly, similarly to the case as illustrated in FIGS. 27 to 29, in case of the four-cylinder gasoline-fueled engine having idling engine speed (the first predetermined engine speed $N_1$) of 750 r.p.m., the composite spring constant ($k_1k_2/(k_1+k_2)$) of the rotational spring constant $k_1$ of the inner annular rubber 119 (first elastic member) and the rotational spring constant $k_2$ of the outer annular rubber (second elastic member) 121 is so set as to cause the antiresonance frequency f to be generally coincident with the 2nd harmonic component of engine speed, i.e., 25 Hz (($750/60)\times 2$). Additionally, in case that the four-cylinder gasoline-fueled engine has the high idling engine speed (the second predetermined engine speed $N_2$) of 1000 r.p.m., the spring constant $k_2$ of the outer annular rubber 121 is so set as to cause the antiresonance frequency f to be generally coincident with the 2nd harmonic component of engine speed, i.e., 33 Hz (($1000/60)\times 2$).

With the thus arranged vibration reducing system V of this embodiment, when the engine 140 is in an engine speed range up to about 790 r.p.m. and containing the idling engine speed of 750 r.p.m., current supply to the electromagnet 123 is interrupted under the action of the signal from the controller 122 so that the electromagnetic clutch mechanism 120, 123 is brought into its inoperative state (or switched OFF). Accordingly, both the inner and outer annular rubbers 119, 121 serve as the spring components, and therefore the first antiresonance appears corresponding to the composite spring constant ($k_1k_2/(k_1+k_2)$) of the inner annular rubber 119 (first elastic member) and the outer annular rubber (second elastic member) as indicated by a curve E8 in FIG. 34.

When the engine 140 is in another engine speed range of from about 790 r.p.m. to about 1200 r.p.m. and containing the high idling engine speed of 1000 r.p.m., current supply to the electromagnet 123 is made under the action of the signal from the controller 122 so that the electromagnetic clutch mechanism 120, 123 is put into its operative state (or switched ON). Accordingly, only the outer annular rubber 121 serves as an elastic member or spring component, so that the second antiresonance appears corresponding to the rotational spring constant $k_2$ of the outer annular rubber 121, as indicated by a curve E9 in FIG. 34.

Further, when the engine 110 is in an engine speed range over about 1200 r.p.m., current supply to the electromagnet 123 is interrupted so as to put the electromagnetic clutch mechanism 120, 123 into its inoperative state (or switched OFF). Accordingly, both the inner and outer annular rubbers 119, 121 serve as the elastic members or spring components, similarly to the above case.

As appreciated from the above, also in this instance with the ninth embodiment of the vibration reducing system V, the spring constant of the elastic body of the accessories rotational vibration system can be controlled in a two-stage manner.

Figure 34:
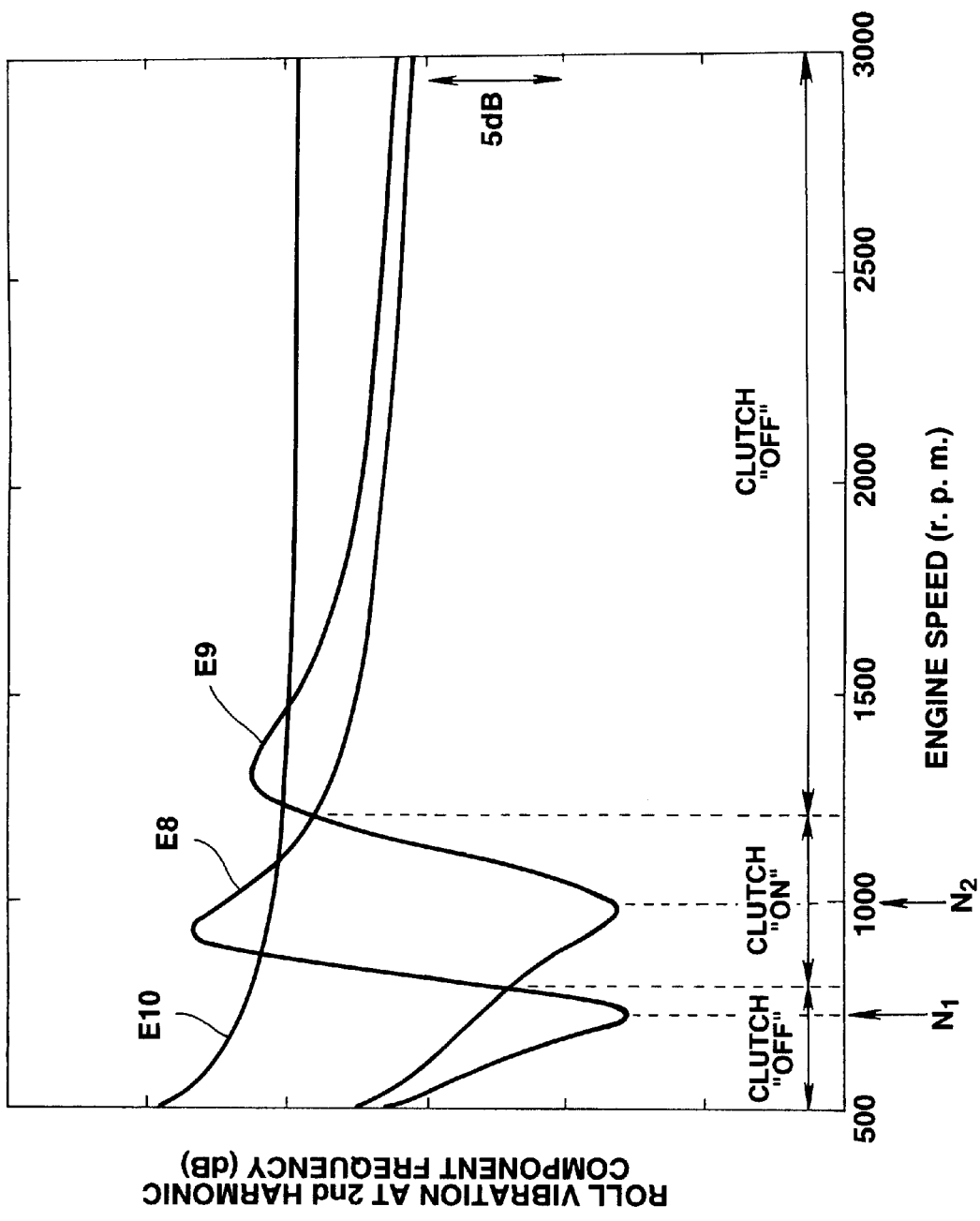
FIG. 34 is a graph showing a vibration reduction characteristics of the engine of FIG. 31.

FIG. 34 depicts vibration reduction characteristics of this embodiment vibration reducing system V, in which the first antiresonace appears in the idling engine speed range, and the second antiresonance appears in the high idling engine speed range. Additionally, it will be understood that roll vibration of the engine 140 can be sharply lowered under the opposite-direction rotation of the auxiliary flywheel 18 relative to the crankshaft 12. Furthermore, since the resonance frequency of the accessories rotational vibration system is largely separate from the antiresonance frequency of the same, an engine operating region in which roll vibration reduction effect is obtained can be enlarged, thereby facilitating setting of the antiresonance frequency. FIG. 34 contains a curve E10 which indicates the vibration reduction characteristics of a conventional engine which is similar to the engine 140 with the exception that no auxiliary flywheel 18 is provided, for the comparison purpose.

Figure 35:
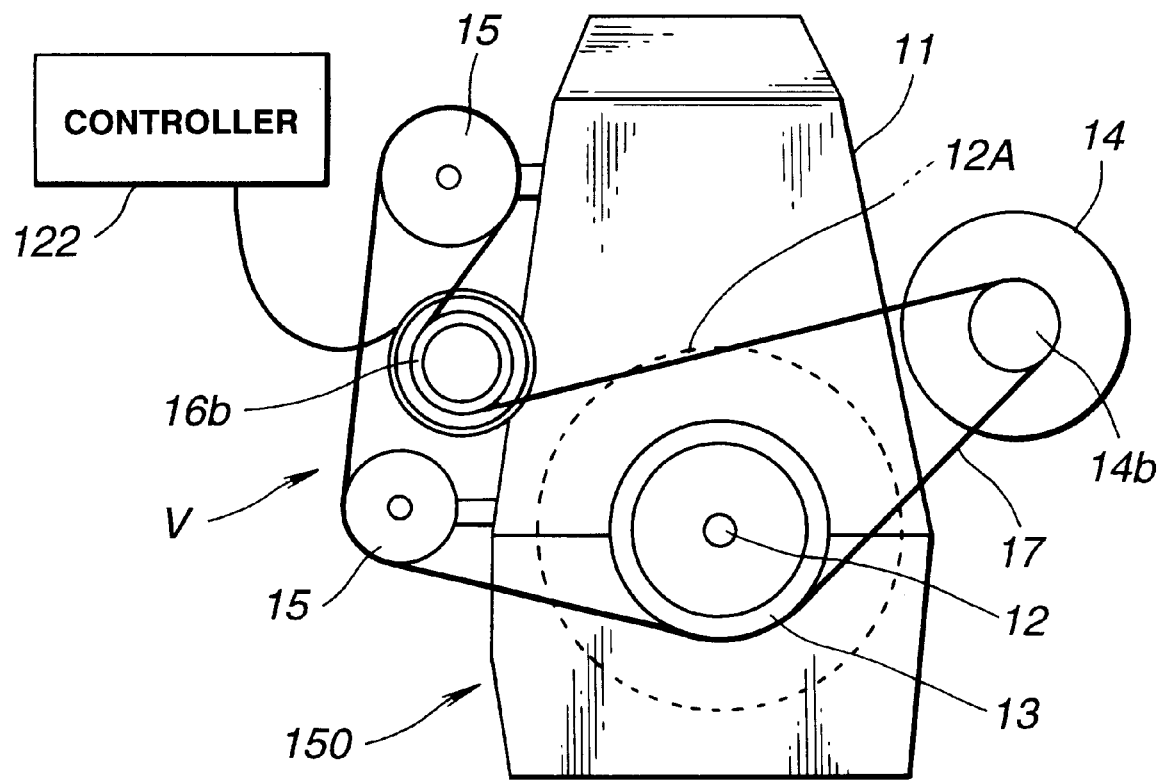
FIG. 35 is a schematic front elevation of an engine provided with a tenth embodiment of the vibration reducing system according to the present invention.
Figure 36:
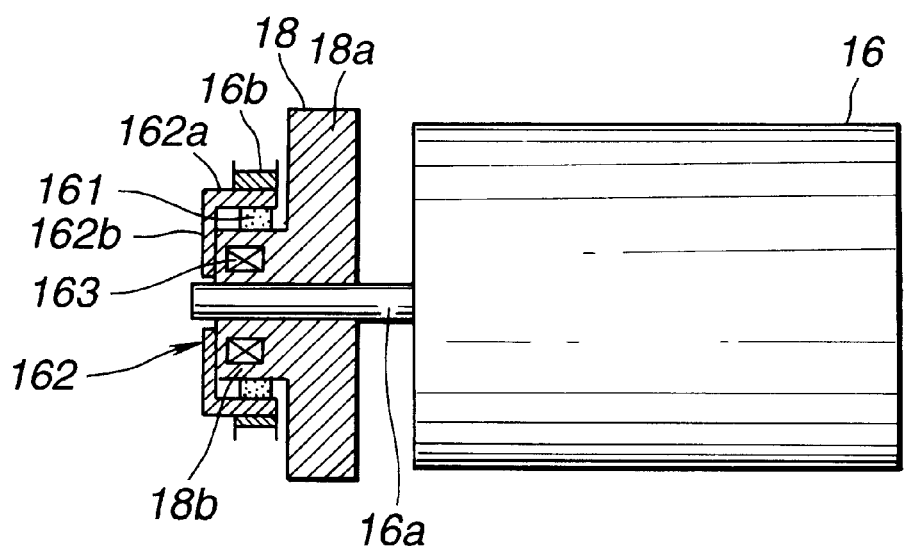
FIG. 36 is a schematic enlarged side view showing the connectional relationship between an auxiliary flywheel and an accessory of the engine of FIG. 35.
Figure 37:
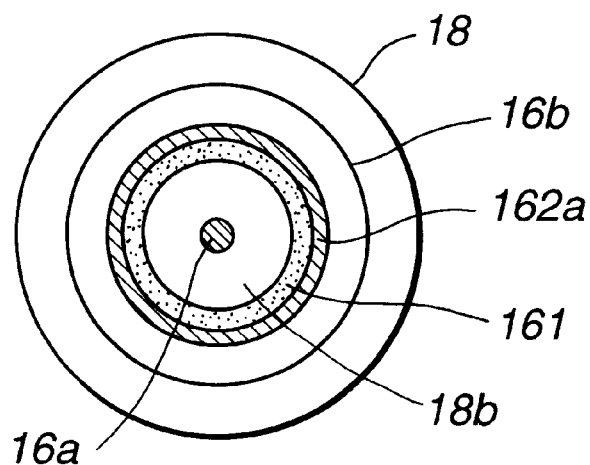
FIG. 37 is a schematic enlarged front view showing the connection relationship of FIG. 36.

FIG. 35 illustrates an engine 140 provided with a ninth embodiment of the vibration reducing system V according to the present invention. The engine 140 of this instance is similar to that in FIG. 31, and the vibration reducing system V is similar to that in FIG. 31 with the exception that the outer annular rubber 121 is omitted. More specifically, as shown in FIGS. 36 and 37, the auxiliary flywheel 18 serving as an inertial mass member is fixedly mounted on the rotational shaft 16a of the power steering pump 16. The auxiliary flywheel 18 has a large diameter section 18a, and a small diameter section 18b which are coaxial and integral with each other. An annular rubber 161 is securely mounted or bonded on the outer peripheral surface of the small diameter section 18b, serving as an elastic member. A generally cup-shaped clutch plate 162 has a cylindrical section 162a, and an annular disc section 162b. The cylindrical section 162a is securely mounted on or bonded to the outer peripheral surface of the annular rubber 161. Additionally, the power steering pump pulley (or driven pulley) 16b is securely mounted on or bonded to the outer peripheral surface of the cylindrical section 162a of the clutch plate 162, thereby functioning to supply a rotational driving force to the auxiliary flywheel 18 and to the rotational section of the power steering pump 16. An electromagnet 163 is embedded in the small diameter section 18b of the auxiliary flywheel 18 and arranged to be controlled to be switched ON and OFF upon receiving signals from the controller 122. The electromagnet 163 and the clutch plate 162 constitute an electromagnetic clutch mechanism (not identified). When the electromagnet 163 is energized upon receiving a signal from the controller 122, the electromagnet 163 is energized to attract the clutch plate 162 so as to restrain the annular rubber 161 from deformation. When the electromagnet 163 is de-energized upon receiving another signal from the controller 122, the clutch plate 162 is released so as to allow the annular rubber 161 to deform.

In this instance, the antiresonance frequency f is given by the equation (7) similarly to the above instance, and therefore the spring constant of the annular rubber 161 is set so as to cause the antiresonance frequency f to be generally coincident with the 2nd harmonic component of the idling engine speed of 750 r.p.m., i.e., 25 Hz ((750/60)×2) in case of a four-cylinder gasoline-fueled engine.

With the thus arranged vibration reducing system V of this embodiment, when the engine 150 is in an engine speed range up to about 790 r.p.m. and containing the idling engine speed of 750 r.p.m., the electromagnetic clutch mechanism 162, 163 is brought into its inoperative state (or switched OFF) so that the annular rubber 161 is allowed to deform. At this time, the annular rubber 161 serves as an elastic member or spring component of the accessories rotational vibration system, thus exhibiting a vibration reduction characteristics indicated by a curve E11 in FIG. 38.

When the engine 150 is in another engine speed range over about 790 r.p.m., the electromagnetic clutch mechanism 162, 163 is put into its operative state (or switched ON) so that the annular rubber 161 is restrained from its deformation. As a result, a rigid connection is established between the auxiliary flywheel 18 and the power steering pump pulley 16b, thereby thus exhibiting a vibration reduction characteristics indicated by a curve E12 in FIG. 38.

Figure 38:
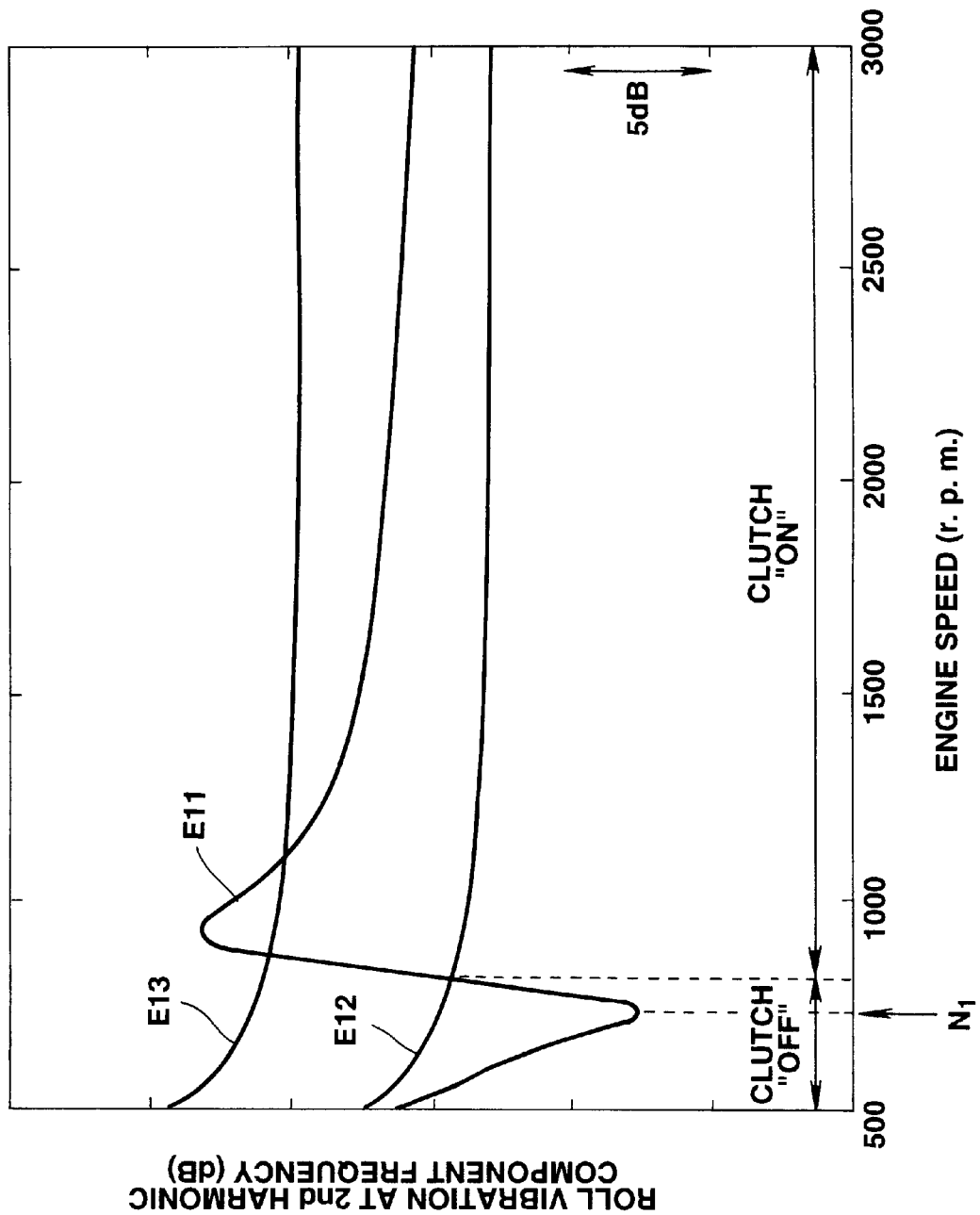
FIG. 38 is a graph showing a vibration reduction characteristics of the engine of FIG. 35.

FIG. 38 depicts vibration reduction characteristics of this embodiment vibration reducing system V, in which the antiresonace appears in the idling operating condition having the engine speeds up to 790 r.p.m. thereby sharply reducing roll vibration of the engine 150. Additionally, in other engine operating conditions than the idling operating condition, roll vibration of the engine 150 can be also sharply lowered under the opposite-direction rotation of the auxiliary flywheel 18 relative to the crankshaft 12. This is because a reaction of the rotational inertial force applied to the auxiliary flywheel 18 under the reverse rotation of the auxiliary flywheel 18 acts in a direction to cancel roll vibration of the engine 150.

While only the electromagnetic clutch mechanism (120, 123; 162, 163) has been shown and described in the embodiments of FIGS. 27 to 38, it will be understood that other clutch mechanisms such as a centrifugal clutch may be used in place of the electromagnetic clutch.

Figure 39:
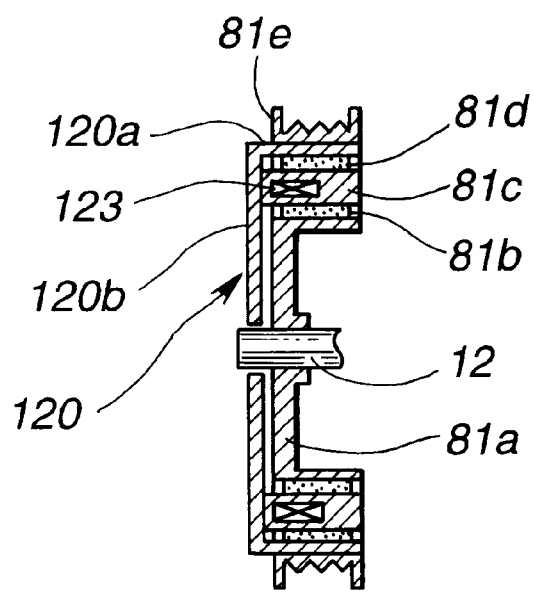
FIG. 39 is a schematic enlarged front view similar to FIG. 25 but showing a part of an example in which the principle of the eighth to tenth embodiments is applied.

Although the elastic member 119, 121, 161 and the clutch mechanism 120, 123; 162, 163 have been shown and described as being disposed on the side of the driven pulley 14b, 16b, it will be appreciated that the elastic member and the clutch mechanism may be disposed on the side of the crankshaft pulley 13, for example, as shown in FIG. 39 in which the clutch mechanism 120, 123 is applied to the crankshaft pulley 81 of the seventh embodiment of the vibration reducing system V. More specifically, as shown in FIG. 39, the cylindrical section 120a of the clutch plate 120 is securely mounted on or bonded to the outer peripheral surface of the outer annular rubber 81d. The annular pass-on section 81e on which the driving belt 17 is passed on is securely mounted on or bonded to the outer peripheral surface of the cylindrical section 120a of the clutch plate 120. The annular disc section 120b of the clutch plate 120 is located around the front end section of the crankshaft 12 and is in contact with the annular mass section 81c in which the electromagnet 123 is embedded. The electromagnet 123 is electrically connected with the controller 122, though not shown. The controller 122 is arranged to de-energize the electromagnet 123 in the idling operating condition, and energize the electromagnet 123 in other operating conditions of the engine.

As appreciated above, according to the vibration reducing system of the above embodiments of the present invention, the vibration mode of the roll vibration system and the vibration mode of the rotational vibration system through which the rotational driving force is transmitted to the inertial mass member are superimposed thereby canceling the vibrations of the roll and rotational vibration systems in the engine operating region where the vibrations are opposite in phase. This establishes a condition where a vibration level is extremely minimized or becomes a generally zero level, i.e., an engine operating region where antiresonance is caused.

In this connection, the rotational vibration system is adjusted such that the antiresonance frequency at which the antiresonance occurs becomes generally coincident with one of frequencies which are obtained respectively by multiplying an engine-revolutional frequency fn (=N/60) at a predetermined engine speed N (r.p.m.) by values each of which is represented by (a natural number/2) or 0.5, 1, 1.5, 2, 2.5, 3, . . . More specifically, in case of a four-cylinder engine, roll vibrations caused by the frequency components such as the 2nd harmonic component, the 4th harmonic component, the 6th harmonic component, . . . and the like of the engine speed become large. In case of a six-cylinder engine, roll vibrations caused by the frequency components such as the 3rd harmonic component, the 6th harmonic component, . . . and the like of the engine speed becomes large. In case of an eight-cylinder engine, roll vibrations caused by the frequency components such as the 4th harmonic component, the 8th harmonic component, . . . and the like of the engine speed become large. Further in case that there is irregularity in combustion among a plurality of cylinders, roll vibrations caused by frequency components such as the 0.5th harmonic component, . . . the 1st harmonic component, the 1.5th harmonic component, . . . and the like are generated. Accordingly, by adjusting the rotational vibration system such that the above-mentioned antiresonance frequency f becomes generally coincident with either one of the frequency components or harmonic components in the engine, the roll vibration of the engine can be sharply reduced.

Furthermore, the rotational vibration system preferably includes an elastic body serving as a spring component, in which a spring constant variably controlling device is provided to variably controlling the spring constant of the elastic body so as to provide plural stages of the spring constant. This can sharply reduce roll vibration of the engine in a plurality of engine operating ranges.

The entire contents of Japanese Patent Applications P10-137172 (filed May 19, 1998) and P10-137182 (filed May 19, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A vibration reducing system of an internal combustion engine, comprising:

a roll vibration system which generates a roll vibration of an engine main body, the roll vibration having a first vibration mode; and a rotational vibration system which generates a rotational vibration having a second vibration mode, and includes a crankshaft of the engine, for generating a rotational driving force, a main flywheel fixedly connected to said crankshaft, a driving force transmitting mechanism through which the rotational driving force of said crankshaft is transmitted, said driving force transmitting mechanism being movably secured to said engine main body, and an inertial mass member drivably connected to said driving force transmitting mechanism and rotatable to generate an inertial force upon receiving the rotational driving force transmitted through said driving force transmitting mechanism;

wherein said first and second vibration modes cause antiresonance at an antiresonance frequency;

wherein said rotational vibration system is adjusted to cause said antiresonance frequency to be generally coincident with one of frequencies which are obtained respectively by multiplying an engine-revolutional frequency at a predetermined engine speed by values each being represented by (a natural number/2).

2. A vibration reducing system as claimed in claim 1, wherein said rotational vibration system is adjusted to cause said antiresonance frequency to be coincident with a frequency which is obtained by multiplying an engine-revolutional frequency at a predetermined engine speed by a value (a number of cylinders of the engine/2).

3. A vibration reducing system as claimed in claim 1, wherein said predetermined engine speed is an engine speed in an idling operating condition of the engine.

4. A vibration reducing system as claimed in claim 1, wherein said driving force transmitting mechanism includes a crankshaft pulley connected to the crankshaft of the engine so as to be rotatable as a single body, a driven pulley disposed coaxial with said inertial mass member so as to be rotatable as a single body, and an elastic belt for connecting said crankshaft pulley with said driven pulley to drive said driven pulley.

5. A vibration reducing system as claimed in claim 1, wherein said inertial mass member and said driven pulley are fixedly mounted on a rotational shaft of an engine accessory so as to be rotatable as a single body.

6. A vibration reducing system as claimed in claim 4, wherein said inertial mass member is connected through an elastic member with said driven pulley so as to be rotatable as a single body.

7. A vibration reducing system as claimed in claim 5, wherein said inertial mass member is connected through an elastic member with said driven pulley so as to be rotatable as a single body.

8. A vibration reducing system as claimed in claim 7, wherein said inertial mass member is directly mounted through said elastic member on the rotational shaft.

9. A vibration reducing system as claimed in claim 7, wherein said inertial mass member is directly mounted on the rotational shaft, wherein said driven pulley is connected through the elastic member with said inertial mass member.

10. A vibration reducing system as claimed in claim 4, wherein said crankshaft pulley includes a central connecting section directly mounted on the crankshaft, a pass-on section on which said elastic belt is passed on, and a first elastic member disposed between said central connecting section and said pass-on section so as to securely connect said central connecting section and said pass-on section.

11. A vibration reducing system as claimed in claim 10, wherein said crankshaft pulley includes a dynamic damper for absorbing vibration of the crankshaft.

12. A vibration reducing system as claimed in claim 11, wherein said dynamic damper includes a mass member interposed between said first elastic member and said central connecting section so as to be securely connected to said first elastic member, and a second elastic member interposed between said mass member and said central connecting section to securely connect said mass member and said central connecting section.

13. A vibration reducing system as claimed in claim 1, said driving force transmitting mechanism includes a driving sprocket connected to the crankshaft so as to be rotatable as a single body, a driven sprocket coaxial with said inertial mass member so as to be rotatable as a single body, a driving chain for connecting said driven sprocket with said driving sprocket so as to drive said driven sprocket, and an elastic member interposed between said driving sprocket and said inertial mass member so as to transmit a rotational force of said driven sprocket through said elastic member to said inertial mass member.

14. A vibration reducing system as claimed in claim 1, wherein said driving force transmitting mechanism includes a gear mechanism having a driven gear coaxial with said inertial mass member so as to be rotatable as a single body, said driven gear being driven to rotate under a rotational force of the crankshaft, an elastic member interposed between said driven gear and said inertial mass member so as to transmit a rotational force of said driven gear through said elastic member to said inertial mass member.

15. A vibration reducing system as claimed in claim 13, wherein said inertial mass member is mounted on a rotational shaft of an engine accessory, so as to be rotatable as a single body.

16. A vibration reducing system as claimed in claim 14, wherein said inertial mass member is mounted on a rotational shaft of an engine accessory, so as to be rotatable as a single body.

17. A vibration reducing system as claimed in claim 13, wherein said elastic member is a metal spring.

18. A vibration reducing system as claimed in claim 14, wherein said elastic member is a metal spring.

19. A vibration reducing system as claimed in claim 1, wherein said inertial mass member is rotatable in an opposite direction to a rotational direction of the crankshaft.

20. A vibration reducing system as claimed in claim 1, wherein said driving force transmitting mechanism includes an elastic body serving as a spring component of said rotational vibration system, the rotational driving force from said crankshaft being transmitted through said elastic body to said inertial mass member, wherein said vibration reducing system further comprises a spring constant variably controlling device for variably controlling a spring constant of said elastic member in accordance with an operating condition of the engine.

21. A vibration reducing system as claimed in claim 20, wherein said elastic body has a spring constant at which said antiresonance frequency is generally coincident with a frequency which is obtained by multiplying an engine-revolutional frequency at a predetermined engine speed by a value (a number of cylinders of the engine/2), wherein said spring constant variably controlling device includes a clutch mechanism which has an operative state to restrain said elastic body from deformation, and an inoperative state to allow said elastic body to deform, and a controller adapted to put said clutch mechanism in the inoperative state under a predetermined engine operating condition at said predetermined engine speed, and to put said clutch mechanism in the operative state under engine operating conditions other than said predetermined engine operating condition.

22. A vibration reducing system as claimed in claim 20, wherein said predetermined engine speed is at least one of an idling engine speed, and a high idling engine speed which is higher said idling engine speed.

23. A vibration reducing system as claimed in claim 20, wherein said elastic body includes first and second elastic members which are independent from each other and connected to each other so that the rotational driving force from said crankshaft is transmissible through said first and second elastic members to said inertial mass member, said first and second elastic members being cooperative to provide a composite spring constant at which said antiresonance frequency is generally coincident with a frequency which is obtained by multiplying an engine-revolutional frequency at a first predetermined engine speed by a value (a number of cylinders of the engine/2), said second elastic member having a spring constant at which said antiresonance frequency is generally coincident with a frequency which is obtained by multiplying an engine-revolutional frequency at a second predetermined engine speed by a value (the number of cylinders of the engine/2), wherein said spring constant variably control device includes a clutch mechanism which has an operative state to restrain said first elastic member from deformation, and an inoperative state to allow said first elastic member to deform, and a controller adapted to put said clutch mechanism in the inoperative state under a first predetermined engine operating condition at said first predetermined engine speed, and to put said clutch mechanism in the operative state under a second predetermined engine operating condition at said second predetermined engine speed.

24. A vibration reducing system as claimed in claim 23, wherein said first predetermined engine speed is an idling engine speed, and said second predetermined engine speed is a high idling engine speed which is higher than said idling engine speed.

25. A vibration reducing system as claimed in claim 21, wherein said driving force transmitting mechanism includes a crankshaft pulley fixedly coaxially connected to said crankshaft to as to rotatable with said crankshaft as a single body, and a driven pulley axially connected to said inertial mass member so as to be rotatable with said inertial mass member as a single body, and a driving belt passed on said crankshaft pulley and driven belt so that said driven pulley is drivably connected with said crankshaft pulley.

26. A vibration reducing system as claimed in claim 25, wherein said elastic body and said clutch mechanism are coaxially connected to said driven pulley.

27. A vibration reducing system as claimed in claim 25, wherein said elastic body and said clutch mechanism are coaxially connected to said crankshaft pulley.

28. A vibration reducing system of an internal combustion engine, comprising:
  a roll vibration system which generates a roll vibration of an engine main body, the roll vibration having a first vibration mode; and
  a rotational vibration system which generates a rotational vibration having a second vibration mode, and includes
    a crankshaft of the engine, for generating a rotational driving force;
    a main flywheel fixedly connected to said crankshaft;
    a driving force transmitting mechanism through which the rotational driving force of said crankshaft is transmitted, said driving force transmitting mechanism being movably secured to said engine main body, and
    an inertial mass member drivably connected to said driving force transmitting mechanism and rotatable to generate an inertial force upon receiving the rotational driving force transmitted through said driving force transmitting mechanism;
  means for causing said first and second vibration modes to make antiresonance at an antiresonance frequency; and
  means for adjusting said rotational vibration system to cause said antiresonance frequency to be generally coincident with one of frequencies which are obtained respectively by multiplying an engine-revolutional frequency at a predetermined engine speed by values each being represented by (a natural number/2).

29. A vibration reducing system of an internal combustion engine having a roll vibration system which generates a roll vibration of an engine main body, the roll vibration having a first vibration mode, said vibration reducing system comprising:

a rotational vibration system which generates a rotational vibration having a second vibration mode which is coactive with the first vibration mode to occur an antiresonance, said rotational vibration system including a crankshaft of the engine, for generating a rotational driving force, a main flywheel fixedly connected to said crankshaft, a driving force transmitting mechanism through which the rotational driving force of said crankshaft is transmitted, said driving force transmitting mechanism being movably secured to said engine main body, and an inertial mass member drivably connected to said driving force transmitting mechanism and rotatable to generate an inertial force upon receiving the rotational driving force transmitted through said driving force transmitting mechanism;

wherein said rotational vibration system is adjusted to cause said antiresonance frequency to be generally coincident with one of frequencies which are obtained respectively by multiplying an engine-revolutional frequency at a predetermined engine speed by values each being represented by (a natural number/2).

30. A method of reducing vibration in an internal combustion engine including a roll vibration system which generates a roll vibration of an engine main body, the roll vibration having a first vibration mode; and a rotational vibration system which generates a rotational vibration having a second vibration mode, and includes a crankshaft of the engine, for generating a rotational driving force; a main flywheel fixedly connected to said crankshaft; a driving force transmitting mechanism through which the rotational driving force of said crankshaft is transmitted, said driving force transmitting mechanism being movably secured to said engine main body, and an inertial mass member drivably connected to said driving force transmitting mechanism and rotatable to generate an inertial force upon receiving the rotational driving force transmitted through said driving force transmitting mechanism;

said method comprising:

causing said first and second vibration modes to coact so as to make antiresonance at an antiresonance frequency; and adjusting said rotational vibration system so as to cause said antiresonance frequency to be generally coincident with one of frequencies which are obtained respectively by multiplying an engine-revolutional frequency at a predetermined engine speed by values each being represented by (a natural number/2).

31. A method as claimed in claim 30, wherein said driving force transmitting mechanism includes an elastic body serving as a spring component of said rotational vibration system, wherein said method further comprising transmitting the rotational driving force from said crankshaft through said elastic body to said inertial mass member; and variably controlling a spring constant of said elastic member in accordance with an operating condition of the engine.

\* \* \* \* \*